(12) United States Patent
Levine et al.

(10) Patent No.: US 12,236,935 B2
(45) Date of Patent: Feb. 25, 2025

(54) GENERATING DUBBED AUDIO FROM A VIDEO-BASED SOURCE

(71) Applicant: GOOGLE LLC, Mountain View, CA (US)

(72) Inventors: Andrew R. Levine, New York, NY (US); Buddhika Kottahachchi, San Mateo, CA (US); Christopher Davie, Queens, NY (US); Kulumani Sriram, Danville, CA (US); Richard James Potts, Mountain View, CA (US); Sasakthi S. Abeysinghe, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 278 days.

(21) Appl. No.: 17/931,026

(22) Filed: Sep. 9, 2022

(65) Prior Publication Data

US 2024/0087557 A1 Mar. 14, 2024

(51) Int. Cl.
*G10L 13/00* (2006.01)
*G06F 40/58* (2020.01)
(Continued)

(52) U.S. Cl.
CPC .............. *G10L 13/02* (2013.01); *G06F 40/58* (2020.01); *G10L 13/086* (2013.01)

(58) Field of Classification Search
None
See application file for complete search history.

(56) References Cited

U.S. PATENT DOCUMENTS

| | | | |
|---|---|---|---|
| 2008/0092047 A1* | 4/2008 | Fealkoff | G11B 27/11 |
| | | | 715/716 |
| 2014/0039871 A1* | 2/2014 | Crawford | G06F 40/40 |
| | | | 704/2 |

(Continued)

OTHER PUBLICATIONS

"Automatically dub your videos to 20+ foreign languages.", Maestra, downloaded Sep. 9, 2022, https://maestrahelp.zendesk.com/hc/en-us/articles/360053132452-Automatically-dub-your-videos-to-20-foreign-languages.

(Continued)

*Primary Examiner* — Shreyans A Patel
(74) *Attorney, Agent, or Firm* — Oblon, McClelland, Maier & Neustadt, L.L.P.

(57) ABSTRACT

The present disclosure relates to generating and adjusting translated audio from a video-based source. The method includes receiving video data and corresponding audio data in a first language; generating a translated preliminary transcript in a second language; aligning timing windows of portions of the translated preliminary transcript with corresponding segments of the audio data; determining portions of the translated aligned transcript in the second language that exceed a timing window range of the corresponding segments of the audio data in the first language to generate flagged transcript portions; transmitting the original transcript, the translated aligned transcript, and the first speech dub to a first device, the generated flagged transcript portions included in the original transcript and the translated aligned transcript; receiving, from the first device, a modified original transcript; and generating, based on the modified original transcript, a second speech dub in the second language.

20 Claims, 12 Drawing Sheets

(51) Int. Cl.
    *G10L 13/02*     (2013.01)
    *G10L 13/08*     (2013.01)

(56) References Cited

U.S. PATENT DOCUMENTS

| | | | |
|---|---|---|---|
| 2020/0118582 A1* | 4/2020 | Garland | G11B 27/28 |
| 2023/0025800 A1* | 1/2023 | Werfelli | G10L 13/047 |
| 2024/0038271 A1* | 2/2024 | de Juan | G06V 40/50 |

OTHER PUBLICATIONS

"Automatically add subtitles to your videos, and translate automatically to foreign languages.", Maestra, downloaded Sep. 9, 2022, https://maestrahelp.zendesk.com/hc/en-us/articles/360053373931-Automatically-add-subtitles-to-your-videos-and-translate-automatically-to-foreign-languages-.

"Automatically transcribe your audio & video files to text online.", Maestra, downloaded Sep. 9, 2022, https://maestrahelp.zendesk.com/hc/en-us/articles/360052713852-Automatically-transcribe-your-audio-video-files-to-text-online-#main-content.

"Automatic Video Dubbing and Voiceover Services", Maestra, downloaded Sep. 9, 2022, https://maestrasuite.com/video-dubber#how-it-works.

"Add Captions to your videos automatically, in just minutes!", Maestra, downloaded Sep. 9, 2022, https://maestrahelp.zendesk.com/hc/en-us/articles/360053575651-Add-Captions-to-your-videos-automatically-in-just-minutes-.

\* cited by examiner

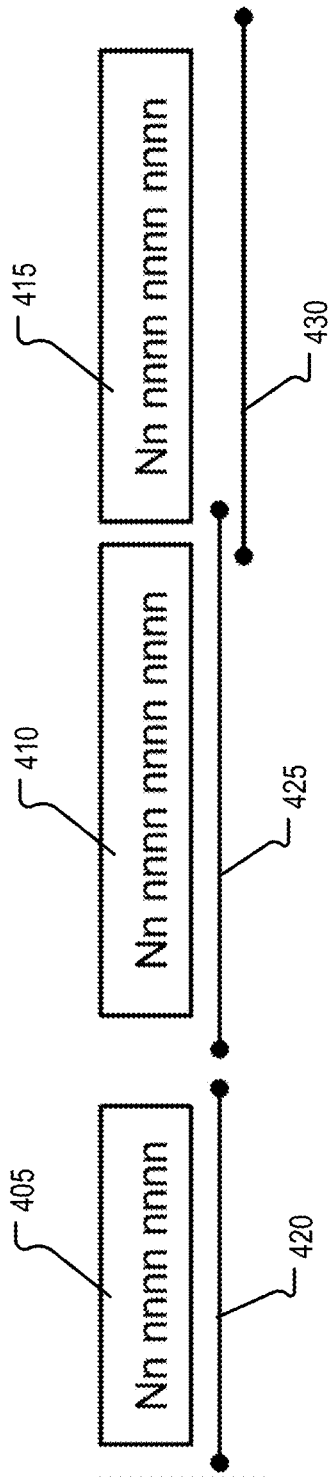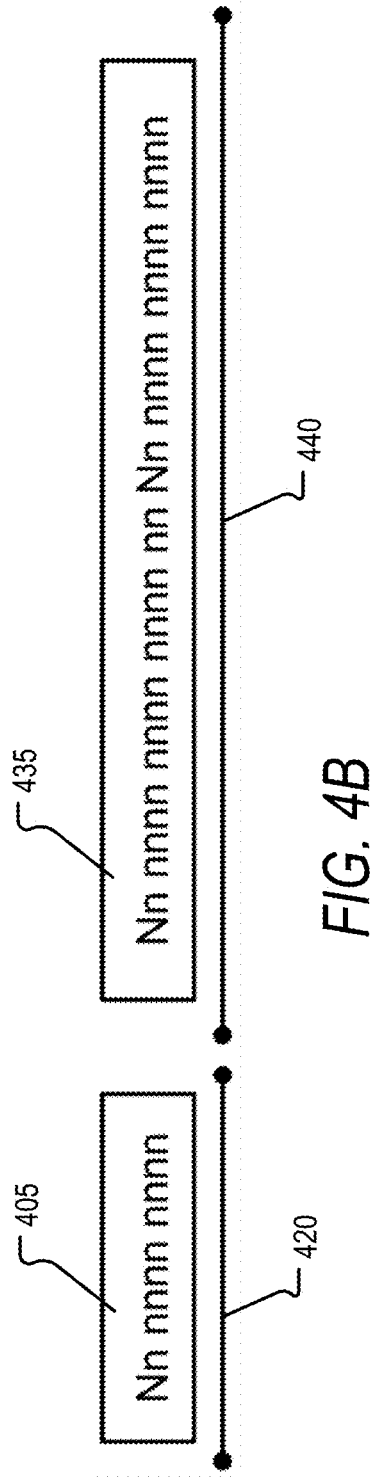

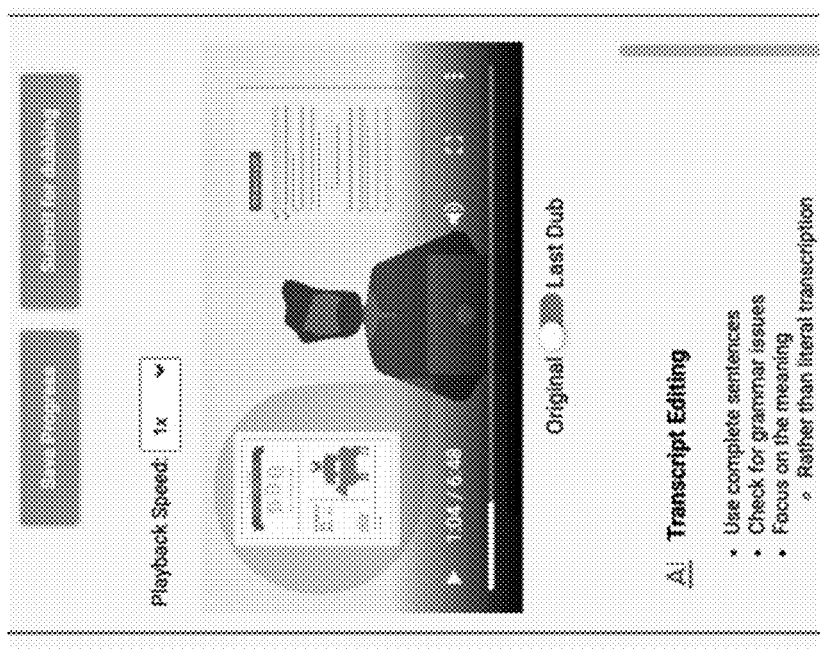
FIG. 6D

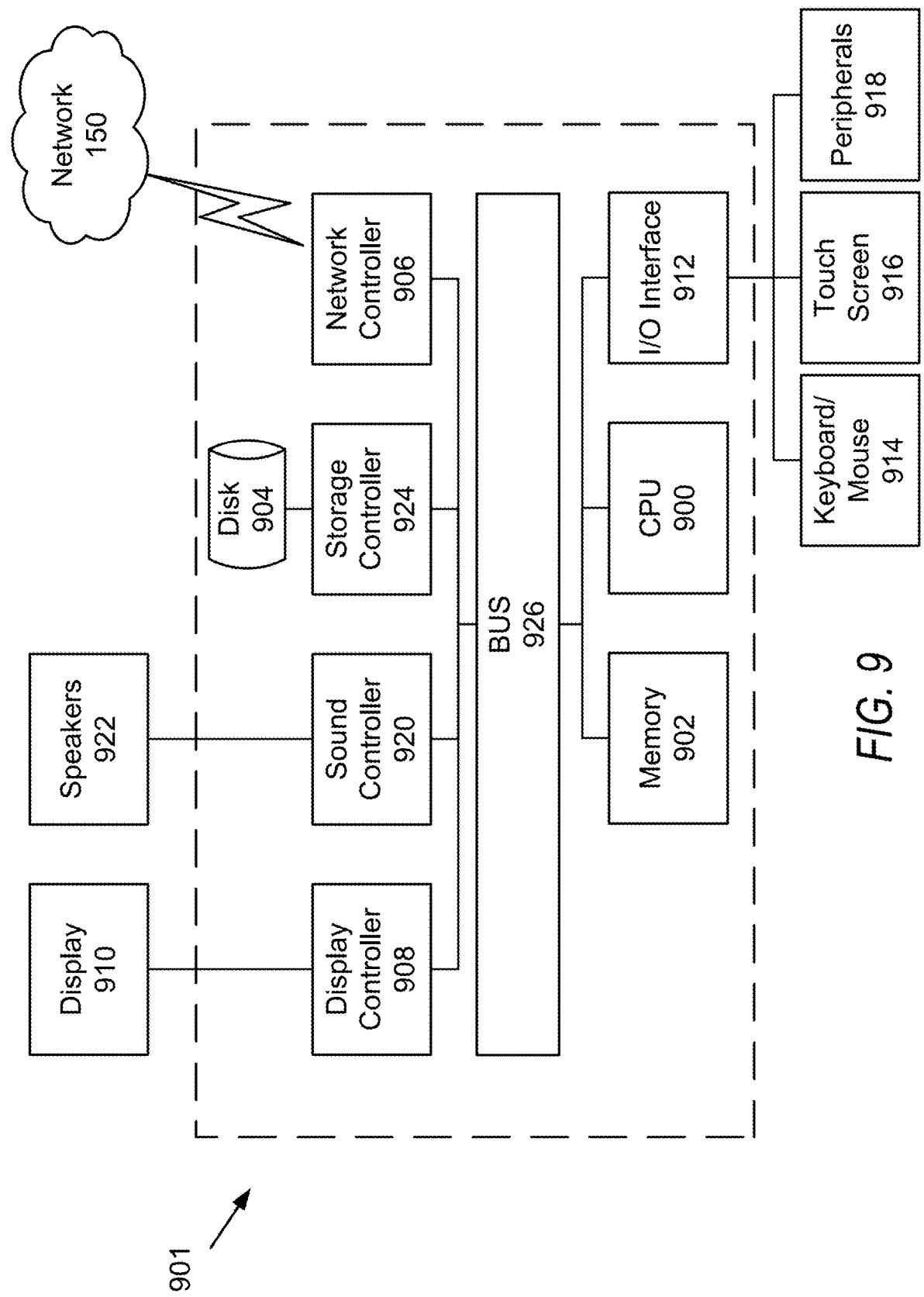

GENERATING DUBBED AUDIO FROM A VIDEO-BASED SOURCE

FIELD OF THE INVENTION

The present disclosure relates to generating and adjusting translated audio from a video-based source.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Dubbing, mixing, or re-recording is a post-production process used in video production, often in concert with sound design, in which additional or supplementary recordings are lip-synced and mixed or combined with original production sound to create a finished soundtrack. The term "dubbing" commonly refers to the replacement of a speaker's original voice with a voice or voices from other speaker(s).

SUMMARY

The present disclosure relates to a method of dubbing a video, including receiving video data and corresponding audio data in a first language; generating, based on this data and an original transcript in the first language, a translated preliminary transcript in a second language; based on the video data in the first language, aligning timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions; based on the translated aligned transcript, generating a first speech dub in the second language and combining the first speech dub with the video data to generate a first dubbed video; transmitting the original transcript, the translated aligned transcript, and the first speech dub to a first device, the generated flagged transcript portions included in the original transcript and the translated aligned transcript; receiving, from the first device, a modified original transcript; and generating, based on the modified original transcript, a second speech dub in the second language.

In an embodiment, the method further includes combining the second speech dub in the second language with the video data excluding the audio data in the first language to generate dubbed a second dubbed video; and outputting the second dubbed video via a user device.

In an embodiment, the flagged transcript portions include text corresponding to portions of the first speech dub that have a timing adjustment applied, and the transmitting the original transcript, the translated aligned transcript, and the first speech dub to the first device further comprises applying a formatting to the text corresponding to portions of the first speech dub that have a timing adjustment applied.

The present disclosure additionally relates to a non-transitory computer-readable storage medium for storing computer-readable instructions that, when executed by a computer, cause the computer to perform a method, the method including receiving video data and corresponding audio data in a first language; generating, based on the audio data and an original transcript in the first language, a translated preliminary transcript in a second language; based on the video data in the first language, aligning timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions; based on the translated aligned transcript, generating a first speech dub in the second language and combining the first speech dub with the video data to generate a first dubbed video; transmitting the original transcript, the translated aligned transcript, and the first speech dub to a first device, the generated flagged transcript portions included in the original transcript and the translated aligned transcript; receiving, from the first device, a modified original transcript; and generating, based on the modified original transcript, a second speech dub in the second language.

The present disclosure additionally relates to an apparatus for dubbing a video, including processing circuitry configured to receive video data and corresponding audio data in a first language; generate, based on the audio data and an original transcript in the first language, a translated preliminary transcript in a second language; based on the video data in the first language, align timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determine portions of the translated aligned transcript in the second language that exceed a timing window range of the corresponding segments of the audio data in the first language to generate flagged transcript portions; based on the translated aligned transcript, generate a first speech dub in the second language and combine the first speech dub with the video data to generate a first dubbed video; transmit the original transcript, the translated aligned transcript, and the first speech dub to a first device, the generated flagged transcript portions included in the original transcript and the translated aligned transcript; receive, from the first device, a modified original transcript; and generate, based on the modified original transcript, a second speech dub in the second language.

Note that this summary section does not specify every embodiment and/or incrementally novel aspect of the present disclosure or claimed invention. Instead, this summary only provides a preliminary discussion of different embodiments and corresponding points of novelty. For additional details and/or possible perspectives of the invention and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein:

FIG. 4A is a schematic of audio segments and time windows, according to an embodiment of the present disclosure.

FIG. 4B is a schematic of merged audio segments, according to an embodiment of the present disclosure.

FIG. 6D shows a schematic of dub speed adjustment editing, according to an embodiment of the present disclosure.

FIG. 9 is a schematic of a hardware configuration of a device for performing a method, according to an embodiment of the present disclosure.

DETAILED DESCRIPTION

Figure 1:
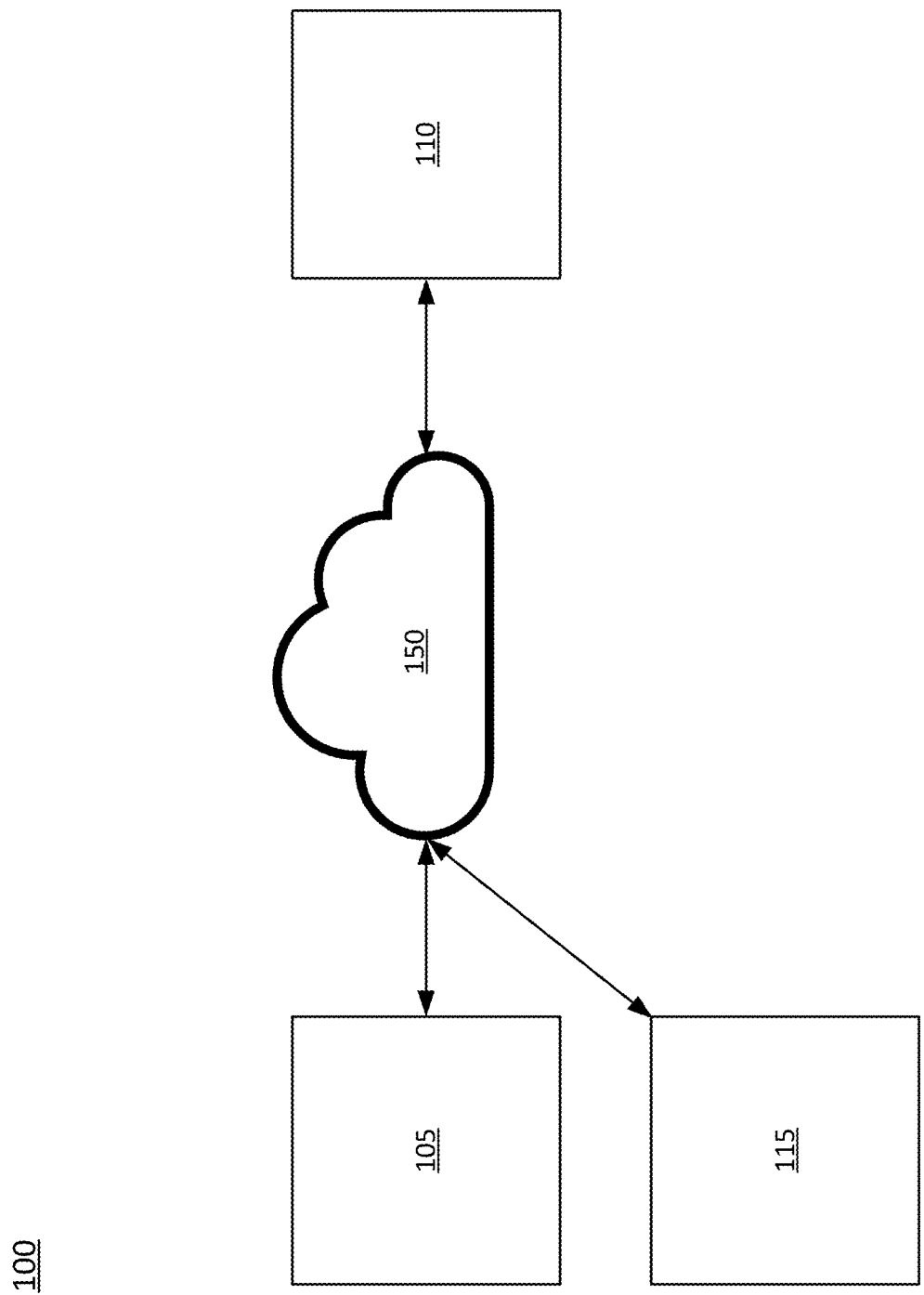
FIG. 1 is a schematic view of a system, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "top," "bottom," "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The order of discussion of the different steps as described herein has been presented for clarity sake. In general, these steps can be performed in any suitable order. Additionally, although each of the different features, techniques, configurations, etc. herein may be discussed in different places of this disclosure, it is intended that each of the concepts can be executed independently of each other or in combination with each other. Accordingly, the present disclosure can be embodied and viewed in many different ways.

Videos are used as a mechanism to exchange ideas, explore different topics, and even to entertain. When a video is in a single language, it can be difficult to disseminate in all these cases. For example, learning can occur online, such as via video, and can reach a broad audience, but the language barrier can still present a challenge to dissemination. Subtitles can help bridge the language gap, but subtitles are not always ideal on mobile devices due to the small form factor, the necessity of constant attention to the screen, and accessibility challenges for those with visual or reading impairments. Dubbing, the process of adding a (translated) voice track, overcomes those limitations, but is time-consuming and cost-prohibitive for most content creators.

Dubbing is the process of adding new dialogue or other sounds to the audio track of a project that has already been filmed. The term "dubbing" came from doubling either a Vitaphone sound disc to synchronize sound with a motion picture or from doubling an actor's voice to films in the beginnings of the sound era. There are two main uses for audio dubbing; ADR (Automated Dialogue Replacement) and language dubbing. ADR is far from automated, as it can be a painstaking process largely reliant on the skill of a performer. ADR is performed on clips when the onset recorded dialogue is unusable, such as background noise interruptions or location-based issues. ADR might also be used when script changes are required after the filming is complete. With ADR, it is often the case that only small sections of a film or video need dubbing. Language dubbing uses the same process as ADR, creating an entirely new version of a film in another language. While ADR needs to be perfectly timed, so the audience is not aware of the dub, a foreign language version of a script will seldomly fit the (timing of) the original video exactly.

The idea of video dubbing is to repeat the performance and dialogue of a scene in a controlled environment and sync it with the recorded footage. Dubbing can take weeks' worth of effort and a large budget. When foreign language dubs are part of a project, it can be a difficult challenge since not all languages translate to the same length. What is said in 5 words in one language could quite easily be, for example, 15 words in another. While professional dubbing performers can be experienced with recreating dialogue as precisely as possible, re-writing lines or re-editing the video to better fit the chosen language can be a consideration. The system and method described herein can provide an improved translation product for a video entailing a timescale of just minutes, if not less, and can allow the original creator of the video to accurately dub the video without the need of a professional performer.

The system and method described herein can include audio separation, machine translation, speech synthesis, timing adjustments, punctuation adjustments, and human intervention to machine-identified problems to reduce time-consuming and costly steps like translation, video editing, and audio production. Notably, the source or the creator providing the video need not know any language other than the creator's main or native language. In an embodiment, the creator can provide the video and an optional subtitles transcript accompanying the video in the original language.

Referring now to the Drawings, FIG. 1 is a schematic view of a system 100, according to an embodiment of the present disclosure. In an embodiment, the system 100 can include a first electronic device 105, such as a client/user device, communicatively connected to a second electronic device 110, such as a server, via a network 150. A third electronic device 115 can be communicatively connected to the first electronic device 105 and the second electronic device 110. The devices can be connected via a wired or a wireless connection. The connection between, for example, the first electronic device 105 and the second electronic device 110 can be via the network 150, wherein the network 150 is wireless. In an embodiment, the first electronic device 105 can be configured to obtain data from the user (of the first electronic device 105), such as a creator of a video, and transmit the data over the communication network 150 to the networked second electronic device 110.

Figure 7:
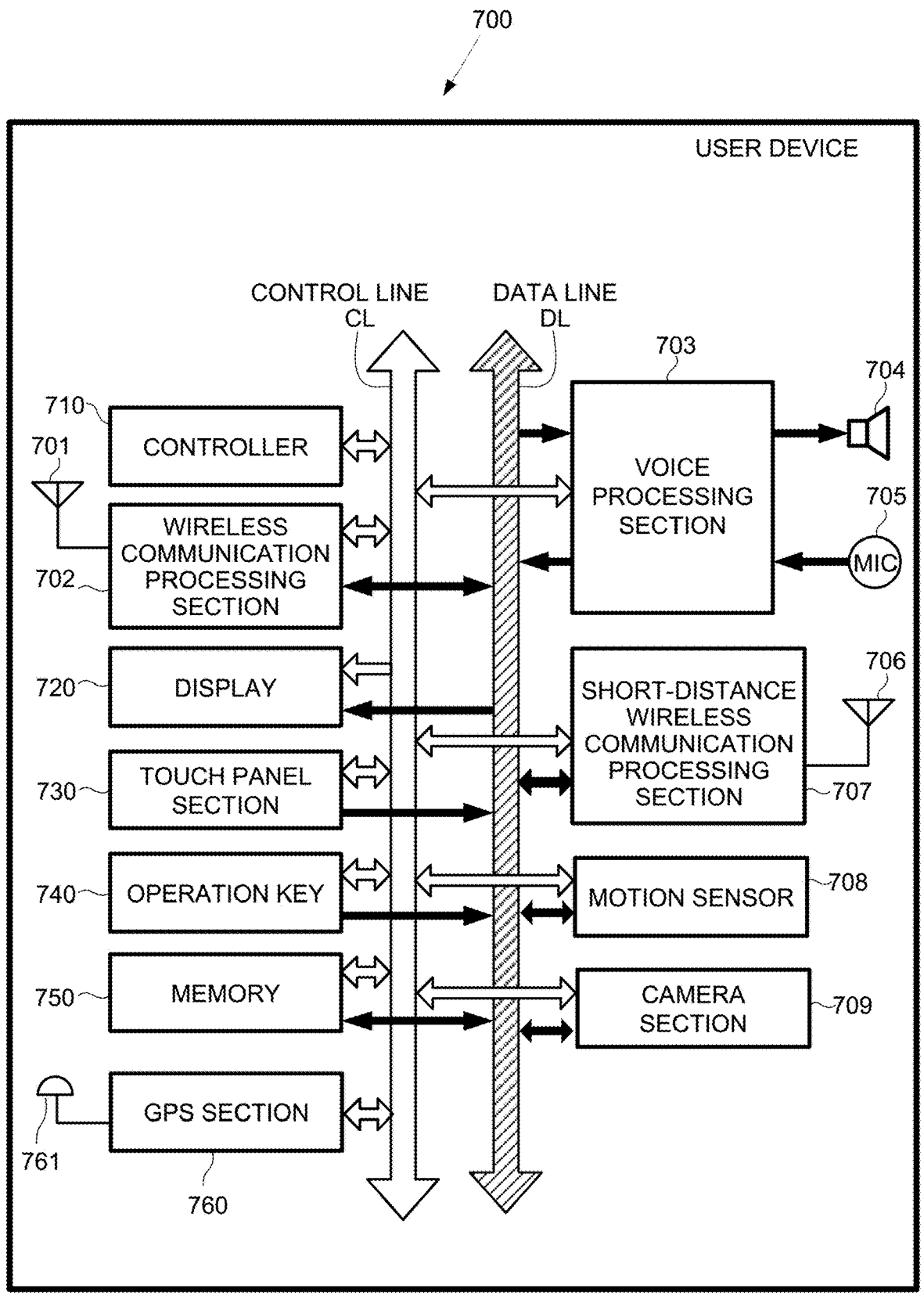
FIG. 7 is a block diagram illustrating an exemplary electronic user device, according to an embodiment of the present disclosure.
Figure 8:
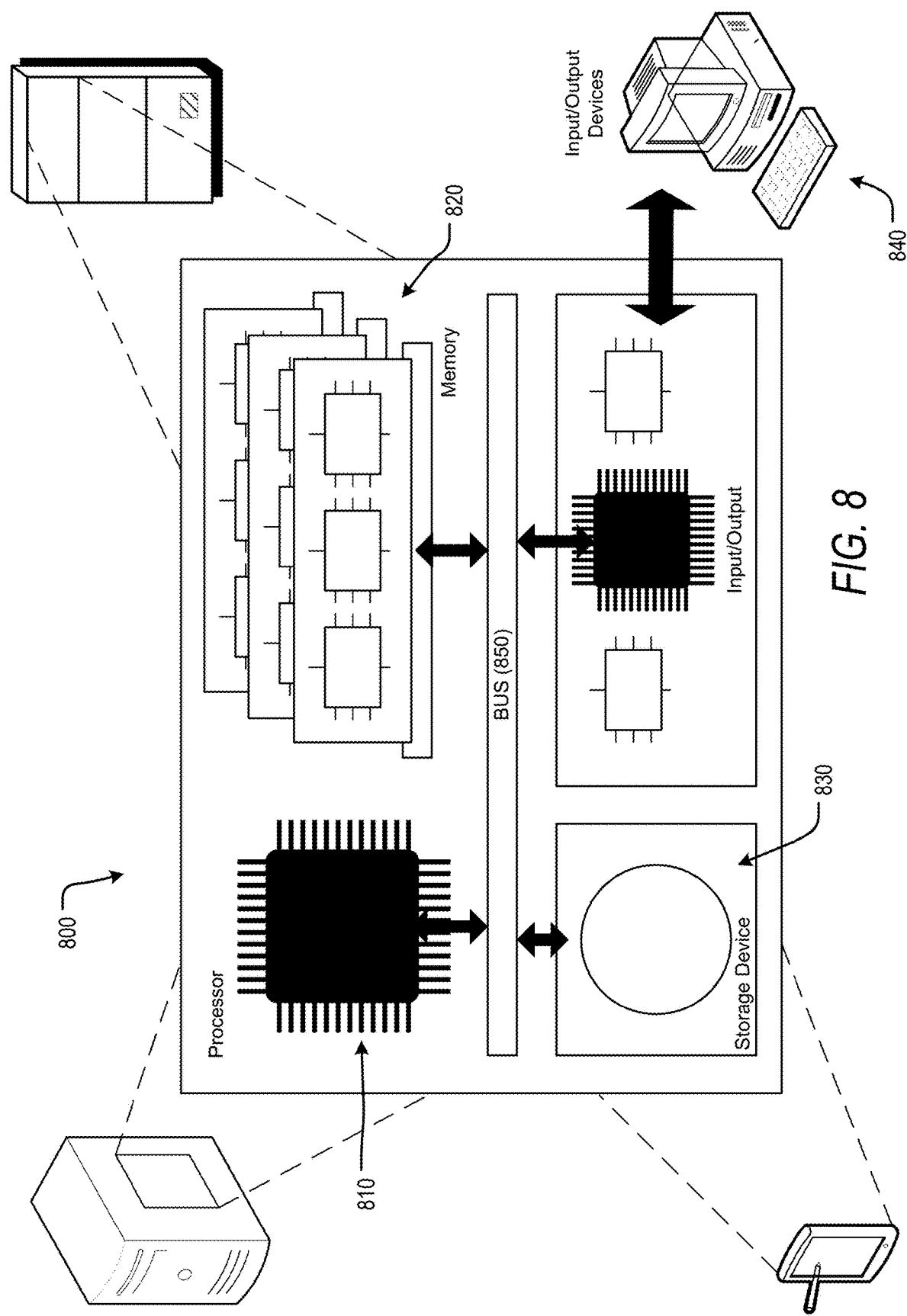
FIG. 8 is a schematic of a hardware system for performing a method, according to an embodiment of the present disclosure.

In an embodiment, the first electronic device 105 can include a central processing unit (CPU), among other components (discussed in more detail in FIGS. 7-9). An application can be installed or accessible on the first electronic device 105 for executing the methods described herein. The application can also be integrated into an operating system (OS) of the first electronic device 105. The first electronic device 105 can be any electronic device such as, but not limited to, a personal computer, a tablet pc, a smart-phone, a smart-watch, a smart-television, an interactive screen, an IoT (Internet of things) device, or the like. Notably, the first electronic device 105 can be used by a user, such as a video content creator, to generate a video in a first language. The first language can be native to the creator. To generate a dubbed version of the video in a second language, the creator can send, via the first electronic device 105, the video in the creator's first language to the second electronic device 110 to generate a dubbed video in a second language. Although the above description was discussed with respect to the first electronic device 105, it is to be understood that the same description applies to the other devices (110 and 115) of FIG. 1.

Figure 2:
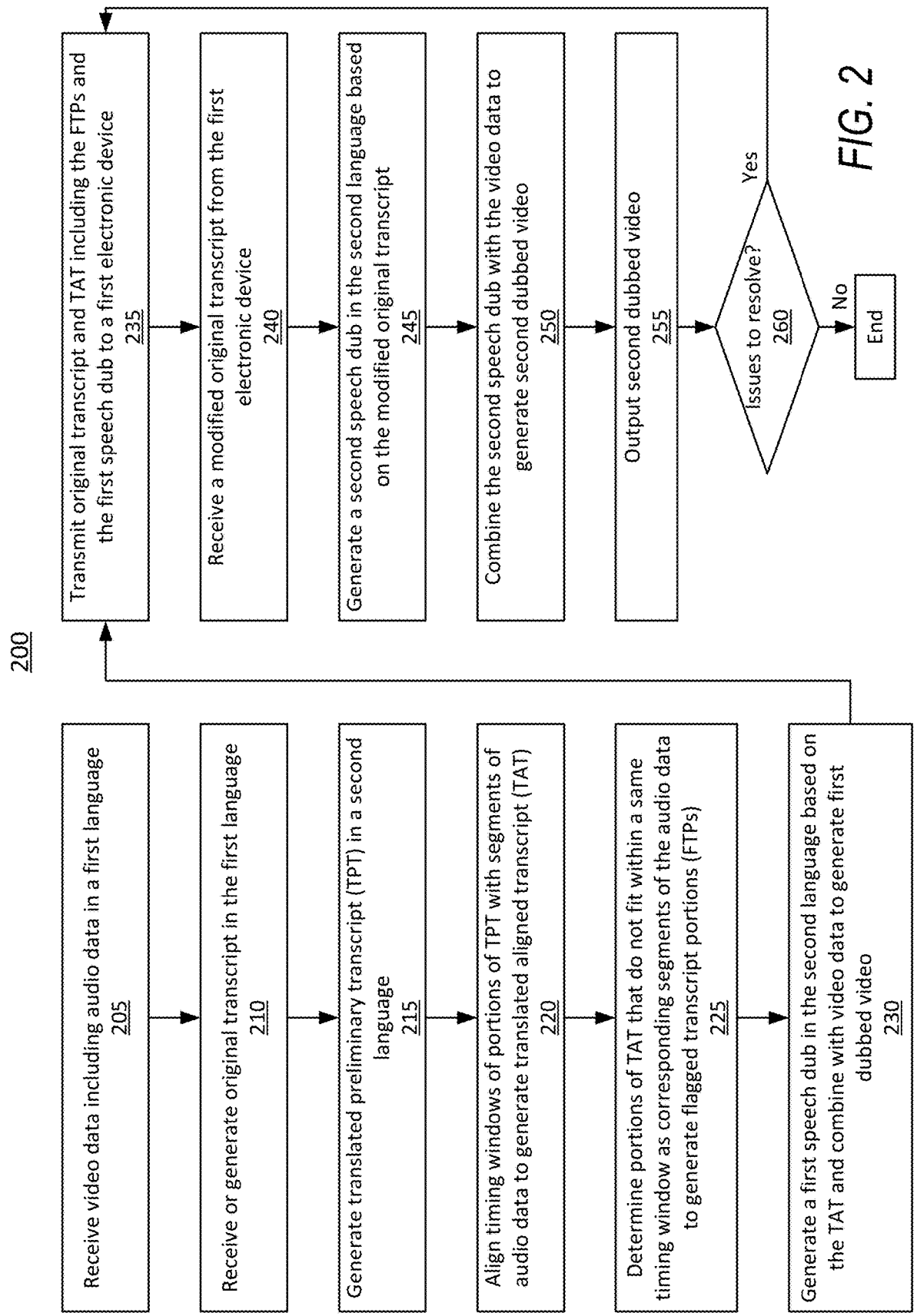
FIG. 2 is a flow chart for a method of generating a dubbed video, according to an embodiment of the present disclosure.

To this end, FIG. 2 is a flow chart for a method 200 of generating a dubbed video, according to an embodiment of the present disclosure. In an embodiment, the second electronic device 110 can receive video data including audio data in the first language in step 205.

In an embodiment, the second electronic device 110 can optionally also receive an original transcript in the first language in step 210.

In an embodiment, the second electronic device 110 can generate a translated preliminary transcript in the second language based on the audio data and the optional original transcript in step 215.

In an embodiment, the second electronic device 110 can align timing windows of portions of the translated preliminary transcript with corresponding segments of the audio data in the first language based on the video data to generate a translated aligned transcript in step 220. Notably, the method can automatically speed up segments, re-align segments, and merge segments automatically to try and find a suitable alignment.

In an embodiment, the second electronic device 110 can, based on the timing windows of the portions of the translated preliminary transcript and timing windows of the corresponding segments of audio data in the first language, determine portions of the translated aligned transcript in the second language that do not fit within a same timing window as the timing windows of the corresponding segments of the audio data in the first language to generate flagged transcript portions in step 225.

In an embodiment, the second electronic device 110 can generate a first speech dub in the second language based on the translated aligned transcript in step 230.

In an embodiment, the second electronic device 110 can transmit the original transcript, the translated aligned transcript, and the first speech dub to the first electronic device 105 (the creator) in step 235, the original transcript and the translated aligned transcript including the generated flagged transcript portions.

In an embodiment, the second electronic device 110 can receive, from the first electronic device 105, a modified original transcript in step 240. The second electronic device 110 can also optionally receive a modified or an updated translated aligned transcript.

In an embodiment, the second electronic device 110 can generate, based on the modified original transcript or the modified translated aligned transcript, a second speech dub in the second language in step 245.

In an embodiment, the second electronic device 110 can combine the second speech dub in the second language with the video data to generate a second dubbed video in step 250. The video data can exclude the audio data in the first language.

In an embodiment, the second electronic device 110 can output the second dubbed video, for example via a display and speakers, or transmit the second dubbed video to the first electronic device 105 (the creator) in step 255.

In an embodiment, the second electronic device 110 can determine whether additional issues are present in the second dubbed video in step 260. Upon determining additional issues are present in the second dubbed video, the method 200 can return to step 235. Upon determining additional issues are not present, the method 200 can end.

Figure 3:
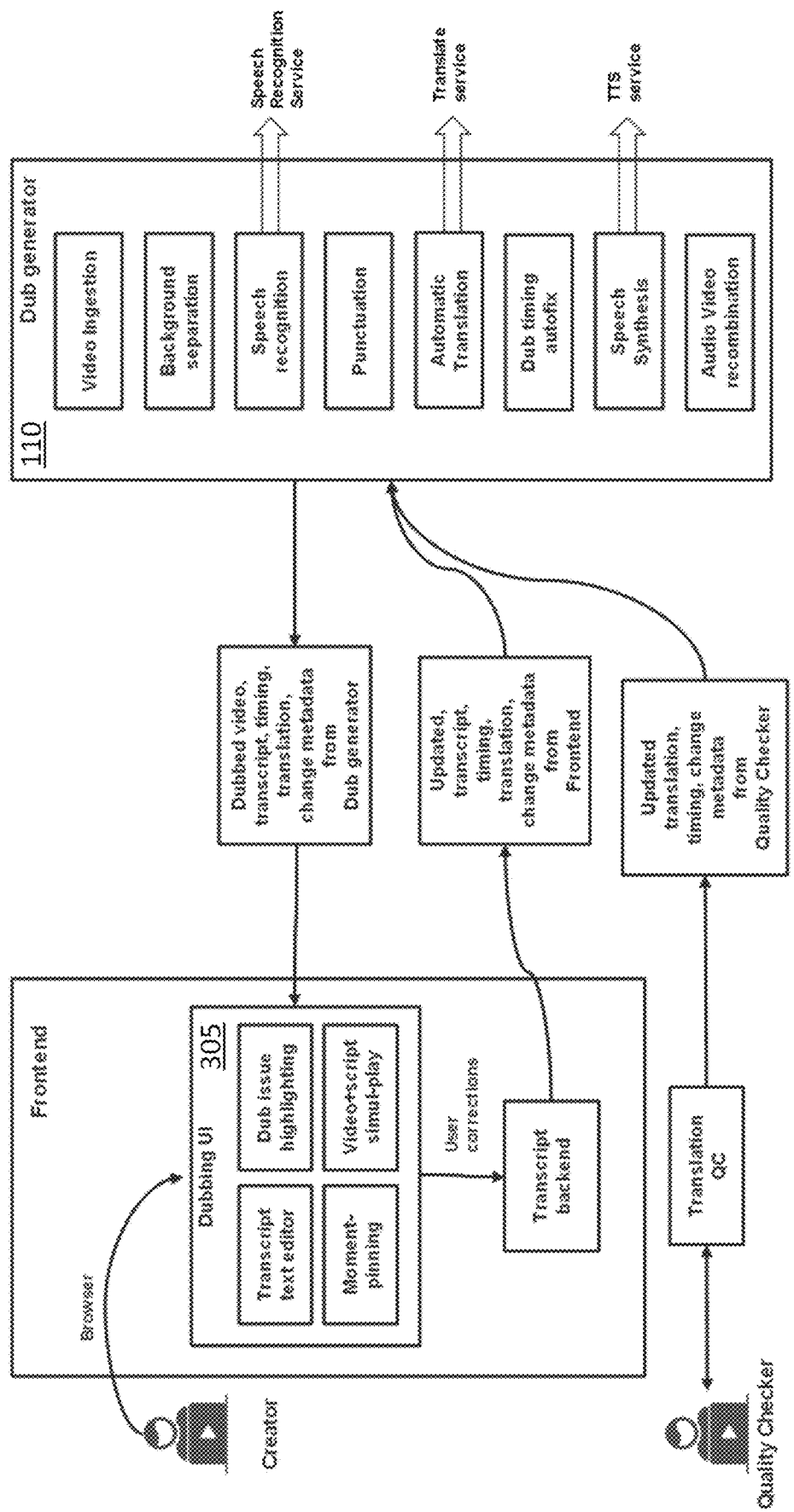
FIG. 3 is a schematic of a framework for generating a dubbed video, according to an embodiment of the present disclosure.

FIG. 3 is a schematic of a framework 300 for generating a dubbed video, according to an embodiment of the present disclosure. In an embodiment, the framework 300 can include an application for the creator to interface with. For example, the framework 300 can include a dubbing user interface (UI) 305 that can be viewed on a browser installed on the first electronic device 105 of the creator, such as Google Chrome.

With reference to step 205 of method 200, the creator can submit or transmit, via the browser on the user's first electronic device 105, the video data to the second electronic device 110 (or the "Dub generator"). In an embodiment, the video data can include audio data that is in the first language, or the creator's native language, and the creator can transmit, via the first electronic device 105, the video data to the second electronic device 110 for translation into the second language.

For example, the creator desires to dub a video about a watch review from English (the first language) to Japanese (the second language). The creator can transmit the watch review video to the second electronic device 110 via the creator's first electronic device 105.

With reference to step 210 of method 200, the creator can optionally also submit an original transcript along with the video data to the second electronic device 110. In an embodiment, the original transcript can be generated by the creator and written in the first language and include the audio data converted to text. The original transcript can be automatically generated by the first electronic device 105 or the second electronic device 110 using a speech to text converter, or written by the creator (e.g., the creator's script for the video or a transcript written while watching and listening to the recorded video). For example, the original transcript generated by the creator can be assumed as most accurate, and then any differences with the automatically-generated original transcript can be highlighted so the creator can select the parts of the automatic transcript that were more accurate than the creator-generated original transcript (e.g., if the creator started talking off a tangent of his/her script). For example, the original transcript can be pre-existing subtitle or closed captions files, which can be intended for use by a video player to show the captions at a corresponding time. However, captions are updated on the screen multiple words at a time. Thus, caption files have some timing information (e.g., show a predetermined entire sentence at a predetermined time), but not at the word level. Notably, the timing information from the closed caption files can be used to aid in the timing alignment described herein.

Notably, the creator can indicate upon transmission of the original transcript the method in which the original transcript was generated. A score of predicted accuracy can be generated by the second electronic device 110 based on the original transcript generation method. For example, a high score of predicted accuracy can be assigned to an original transcript generated by the creator via watching and listening to the recorded video, a medium score of predicted accuracy can be assigned to an original transcript generated by the creator via submitting a drafted script in the event portions of the video dialogue were improvised, and a low score of predicted accuracy can be assigned to an original transcript generated by the creator via a speech to text convertor.

With reference to step 215 of method 200 and the second electronic device 110 of FIG. 3, the second electronic device 110 can receive the video data and the original transcript and use the video data and, optionally, the original transcript to generate a translated preliminary transcript in the second language. In the event the original transcript is not provided or transmitted, the second electronic device 110 can generate the original transcript along with the translated preliminary transcript. In an embodiment, the second electronic device 110 can use processes including video ingestion, background separation of the audio data, speech recognition in the audio data, punctuation detection in the audio data, and auto translation of the audio data using the speech recognition to generate the translated preliminary transcript and the original transcript.

The video ingestion process can take the video data and extract audio from video, separate a background audio track from a voice track, extract text from the voice track, translate text, find desirable timings of the text based on the translated text and original speech timing, create a new voice track using the translated text and the desirable timings, merge a new voice track with a background audio track, and merge the combined audio track into the video.

The background separation process can take the video data and extract just the audio track and then further extract out just the background audio (e.g., music, SFX, other non-speech sounds) by filtering out speech sounds. This audio (without speech in the original language) track, referred to as the background audio track, can be preserved for use in the dubbed version to ensure a similar auditory experience for consumers.

The speech recognition process can take the video data and extract just the audio track and then run the audio track through a text to speech engine to generate an auto-generated original transcript. To produce high-quality dubs, it is important to have precise word-level timings in the original transcript. If a creator-generated original transcript is available, the original transcript generally only includes approximate word-level timings. In this case, a word-alignment step first "aligns" text in the creator-generated original transcript with the speech-to-text original transcript. This alignment evaluates the cost of any alignment through a function that: 1) adds a penalty for every word that is removed or added in order to align the text, and 2) adds a penalty for how closely aligned words match each other. Perfectly identical words have no penalty, words with small differences (e.g., "it's"->"its") have a small penalty, etc. A dynamic programming algorithm can then find the alignment with the globally minimum penalty. Precise timings from the automated speech-to-text original transcript can be transferred to aligned words in the creator-provided original transcript, and timings interpolated if necessary, for any words inserted in the creator-provided original transcript.

The punctuation detection process can take the video data and the original transcript to automatically detect and update the original transcript with missing punctuation. This reduces the likelihood of translation errors since punctuation errors have an outsized impact on translation accuracy. This results in a Punctuation Adjusted Transcript.

The auto translation process can take the video data and the Punctuation Adjusted Transcript and uses a machine translation engine—like Google Translate—to generate a translated preliminary transcript to be used for speech synthesis.

In an embodiment, in the event the original transcript is not provided, the second device 110 can additionally use computer vision techniques to detect relevant words or symbols and analyze a mouth movement of any humans in the video to improve the accuracy of the generation of the original transcript. For example, the creator's video related to the watch review can mistakenly interpret a word as being "amoeba" instead of the watch brand "Omega." In such a scenario, the second electronic device 110 can scan a frame or multiple frames of the video and detect the word "Omega" on a packaging box, the Greek symbol for omega ("Ω") and the words "Seamaster 300M" on the watch dial, and/or the mouth of the reviewer (if the reviewer is in the frame preceding or following the view of the watch) forming the "O" shape versus the "Ah" shape. Further, the second electronic device 110 can flag the word "amoeba" in the original transcript as having a low accuracy or confidence score. Based on the supplementary computer vision-based detection of the relevant features in the frame of the video, the second electronic device 110 can over-ride the determined word via text to speech and replace "amoeba" with "Omega" to improve the accuracy of the original transcript.

Additionally or alternatively, textual analysis of the transcript can be used to make similar corrections. For example, a sentence that starts out with "omegas are crafty shape shifting engineers" could be corrected to "amoebas are crafty shape shifting engineers" based on word usage and sequence patterns seen in language use. In this case, the video context is determined to not be about watches, and instead about biology. Furthermore, as the creator keeps making similar corrections (omega to amoeba, rung to wrung, etc.) in his/her content, a correction process can learn from those corrections and proactively make them for the creator.

With reference to step 220 of method 200 and the second electronic device 110 of FIG. 3, the second electronic device 110 can align the timing between the translated preliminary transcript and the audio data to generate the translated aligned transcript. In an embodiment, the portions of the translated preliminary transcript can be divided based on the speech recognition and punctuation detection of step 215. That is, each portion of the translated preliminary transcript can correspond to a predetermined segment of the audio data. For example, one portion of the translated preliminary transcript can correspond to a first sentence of dialogue in the audio data detected using the punctuation detection process. For example, one portion of the translated preliminary transcript can correspond to dialogue that is spoken and followed by a pause, wherein the one portion corresponds to the dialogue before the pause. Furthermore, upon determining a timing window of a particular portion of the translated preliminary transcript does not exceed a timing window range of the corresponding predetermined segment of the audio data, the second electronic device 110 can shift a timing of the particular portion to align with the corresponding predetermined segment of the audio data more closely. Thus, the translated aligned transcript can be generated based on the results of the timing alignment. For example, the second electronic device 110 can determine the translated portion of the translated preliminary transcript will take longer to speak when dubbed and shift the translated portion to begin speaking sooner in order to end speaking close to the end of the original corresponding predetermined audio segment. This is described further below with regards to step 230.

With reference to step 225 of method 200 and the second electronic device 110 of FIG. 3, the second electronic device 110 can determine which portions of the translated preliminary transcript may not align or fit with the corresponding predetermined segment of the audio data. That is, in an embodiment, the second electronic device 110 can determine portions of the translated aligned transcript that do not fit within a timing window of the corresponding segments of the audio data to generate flagged transcript portions, or portions of the translated aligned transcript that can be adjusted to improve the alignment. The second electronic device 110, as previously described, can have attempted to automatically fix or adjust the timing, but the amount of adjustment can exceed a predetermined adjustment threshold, thereby causing the second electronic device 110 to flag said transcript portions.

For example, in the watch review video, the second electronic device 110 can determine that the presenter's introduction in English is very quick compared to the same introduction translated in the translated aligned transcript. The presenter, in English, can make an introduction quickly by saying "Hi I'm Robert" while the same introduction in Japanese (in Romaji) can be "watashi wa Robert tomoshimasu" and take a longer length of time to speak in the dubbed version.

With reference to step 230 of method 200 and the second electronic device 110 of FIG. 3, the second electronic device 110 can generate a first speech dub of the video data in the second language using the translated aligned transcript and combine the first speech dub with the video data to generate a first dubbed video. In an embodiment, the first speech dub can be generated using a text to speech process and the translated aligned transcript. During automated text-to-speech dubbing, the source audio (the audio data) can include desirable audio intervals (the corresponding predetermined audio segments) to insert dubbed audio content. The desirable audio intervals can represent speech segments that were present in the source video data but can also be annotations in the video that are available separately (e.g., the appearance of captions/titles, etc.).

As described, the dubbed content can be available as text that is either generated automatically through a translation system or manually entered by the creator. The first speech dub audio can further be segmented across the desirable audio intervals. Dubbed audio segments can tolerate a small amount of speedup or slow down of the audio to match a desired audio interval before becoming perceptually undesirable or audibly dissatisfying to a listener. Thus, the method described herein segments the dubbed audio across the desired audio intervals such that each segment roughly matches the original content in that audio interval, but allows some flexibility such that the audio speed adjustments needed to fit the dubbed audio segment within the interval are minimized.

In an embodiment, a score can be assigned to each available audio interval and a string of words. A low score can mean the string of words are a poor fit for the given audio interval, and a high score can indicate the string of words are a good fit for the audio interval. For example, the score can be determined by rendering the provided text and using a percentage difference of the rendered length versus an available length of the audio interval as the score. For example, if a mapping function is available from the translated aligned transcript to the original transcript (often the case when requesting word alignment from the translation API), the amount of non-overlap can be used to determine the score (e.g., with a bleu score). For example, the score can be decreased if the end of the text is not a natural pause (e.g., the last word does not end with a full-stop/other punctuation). For example, audio intervals can be dynamic and a different scoring process can be used on different audio intervals, such as an audio interval preceded and followed by a long silent section can be assigned a high score for audio content that spills over the length of the original audio segment's timing window, compared to an audio interval that is immediately preceded and followed by other audio intervals. Portions of the video that are reserved for voice-over may not particularly care how long the voice-over is, as long as it is smaller than the available region. For example, a score can be assigned by the creator based on creator-provided markers for breaks (e.g., a high score if the span of the dub is in the creator-indicated audio interval and a zero or low score otherwise). Notably, this score can be converted to a visual aid for the creator later to help adjust the flagged transcript portions.

In an embodiment, the score can be given as a function. For example, the function can be score(I, s) such that given an interval, I, and a string, s, returns a value, where lower values are desirable. The problem can be formulated as: given a set of intervals $I_1, I_2, \ldots, I_n$ and a text T, find the breaks in T (i.e., T is the concatenation of the strings $s_1, s_2, \ldots, s_n$) such that the overall cubic score $\Sigma$ score($I_i$, $s_i)^3$ is the minimum, across all possible breaks in T. The cubic term can ensure distribution of scores across intervals, avoiding solutions where a single very undesirable interval is chosen at the cost of slight improvements in all other intervals. Other functions to combine scores are also possible—e.g., summing the squares of individual scores, etc. The breaks may further be calculated efficiently through standard dynamic programming approaches, when the score function only depends on the substring comprising the break or its adjacent neighbors, rather than the entire text T.

Additionally, during automated text-to-speech dubbing, the creator or automation can produce a timed text. This can be translated text that needs to be rendered via text to speech at predetermined timestamps within the video. However, segments of the dubbed audio (the first speech dub) may not fit into the original audio intervals (the corresponding predetermined audio segments). Thus, the timing of the dubbed audio can be adjusted while minimizing speed variations. While the previously described segmentation can attempt to find optimal dubbed audio segments that fit in the allocated original audio intervals, there can still be dubbed audio segments that include too much content for the corresponding original audio interval. Therefore, a time window of the original audio intervals can be increased, or neighboring original audio intervals that would overlap as a result can be merged, to ensure that the translated text to speech content is not sped up by more than a predetermined rate, such as 20%, or 10%, or 5%. This can desync the audio and video in the dubbed video while allowing a more comprehensible speaking rate.

To this end, FIG. 4A is a schematic of audio segments and time windows, according to an embodiment of the present disclosure. In an embodiment, the audio data can include a first audio segment 405 having a corresponding time window 420, a second audio segment 410 having a corresponding time window 425, and a third audio segment 415 having a corresponding time window 430. Each audio segment 405, 410, 415 and corresponding time window 420, 425, 430 can be determined by rendering the text to speech and noting the length of the generated audio. The audio segments 405, 410, 415 can be allowed to speed up to a predetermined maximum rate to stay within the corresponding time window 420, 425, 430, but are also allowed to spill into the neighboring pauses if the audio segment in question cannot stay within the allocated time window even after speeding up to the allowed predetermined maximum rate. As shown in FIG. 4A, the width of the boxes can represent the desired times when the audio segment 405, 410, 415 should be spoken. However, all three audio segment 405, 410, 415 may be unable to fit within the allocated timing window, as indicated by the width of the corresponding time window 420, 425, 430 lines below, even with the applied predetermined maximum speed up rate. That is to say, the sped up dubbed audio needs the width of the lines representing the corresponding time window 420, 425, 430 to fully play, but only has the width of the box of the audio segments 405, 410, 415 to do so.

FIG. 4B is a schematic of merged audio segments, according to an embodiment of the present disclosure. In an embodiment, some of the audio segments 405, 410, 415, such as the second audio segment 410 and the third audio segment 415, overlap the minimum lengths (the time window 425 and the time window 430), indicating that an independent expansion of the time windows to meet the requirements may not achieve satisfactory results. As such, the overlapping audio segments (i.e., the second audio segment 410 and the third audio segment 415) can be merged into a larger combined audio segment 435 having a longer corresponding timing window 440. This can keep the pacing of the audio within the set consistent, jointly use the space between the audio segments in the set, and allocate usable space to the left and the right of the audio segments to all audio segments within the set. This can be repeated until all audio segments are able to stay within the desired limits, or an audio segment remains, wherein it can mean that no feasible solution is under the limit even if all dubbed content is merged into one continuous text or audio segment. The new timing windows and audio segments can be used for text to speech rendering of the dub.

Figure 5:
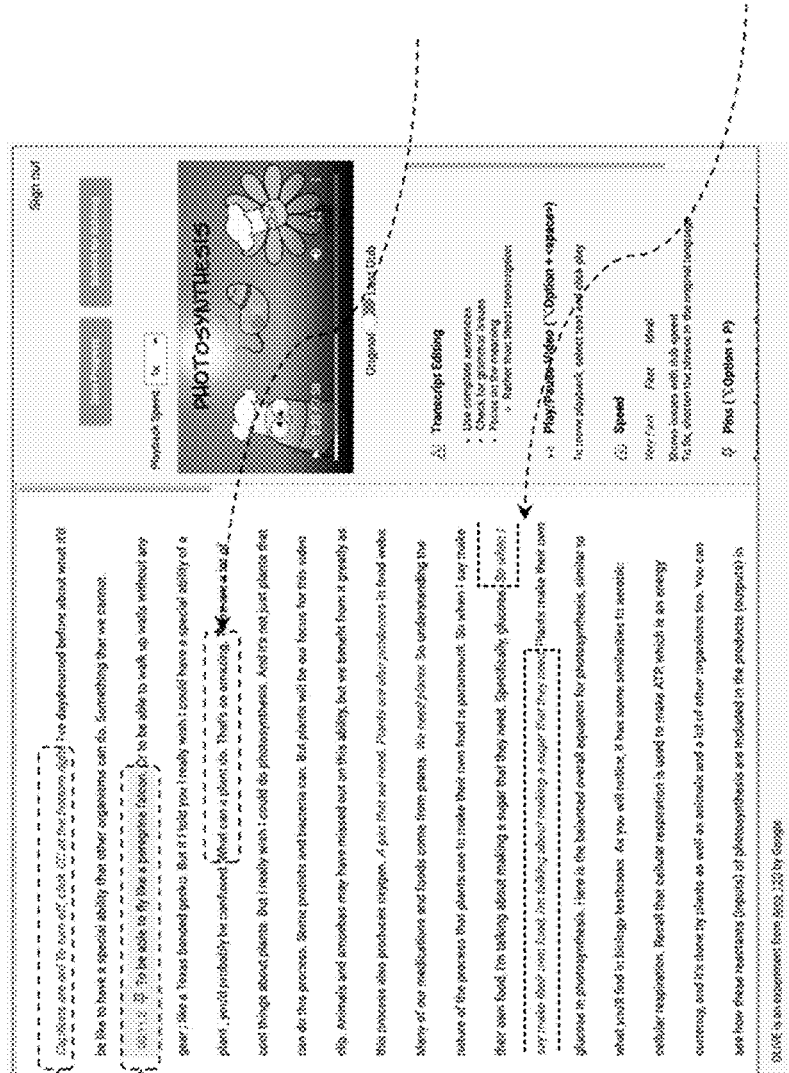
FIG. 5 is a schematic of transcript editing, according to an embodiment of the present disclosure.

FIG. 5 is a schematic of transcript editing, according to an embodiment of the present disclosure. With reference to step 235 of method 200 and the second electronic device 110 of FIG. 3, the second electronic device 110 can transmit the original transcript, the translated aligned transcript, and the first speech dub to the first electronic device 105 (the creator) for editing. In an embodiment, the dubbing UI 305 can display the original transcript and the translated aligned transcript with the flagged transcript portions. That is, the same flagged transcript portions in the translated aligned transcript can be indicated at the same corresponding locations in the original transcript. The dubbing UI 305 can allow the creator to switch between viewing the original transcript and the translated aligned transcript while editing. Additionally or alternatively, a side-by-side of the original transcript and the translated aligned transcript can be shown (with both showing the flagged transcript portions). Both documents can be locked together wherein any action, such as a scroll, in one document is performed in the other. In an embodiment, the documents need not be locked together to allow the creator independent manipulation of one document over the other.

In an embodiment, the video, either in the original native language (original video data) or the dubbed language (the first dubbed video), can be displayed alongside the original transcript or the translated aligned transcript and configured to play at the time in the video corresponding to the selected text in the original transcript or the translated aligned transcript. Further, as the video plays, the text in the original transcript or the translated aligned transcript can have a formatting applied (see below) to show where the audio is currently playing relative to either of the transcript documents. The highlighting can automatically progress as the video progresses, or similarly return back to a previous word if the video is rewound or jump ahead to a later word if the video is skipped to a later time. The video can be switched to play the audio in the original native language or the dubbed language, such as via a toggle button. The dubbing UI 305 can include an option to adjust a playback speed of the video, such as via a drop-down menu.

In an embodiment, a predicted dub quality or usefulness metric can be generated that updates with every edit round of the original transcript or the translated aligned transcript. The usefulness metric can account for ease of listening, translation accuracy, etc. and serve as an indicator for the creator to evaluate the amount of effort he/she may be required to invest in improving the dub. It can also be actionable in providing feedback if the score is based on, for example, a remaining number of speed issues, grammar issues, voice match issues, etc.

In an embodiment, as shown in FIG. 5, the text in the original transcript and the translated aligned transcript can also be formatted to draw attention to the text at the flagged transcript portions. A legend (for example, in the bottom-right of the dubbing UI 305) can indicate various formatting definitions. For example, the legend can indicate that text without any formatting indicates the first speech dub is at an ideal or unchanged speed. That is, no additional speedup rate was applied to the audio segment corresponding to the text without any formatting, or unformatted text. For example, the legend can indicate text having a first format, such as italicized text, which indicates the first speech dub is at a fast speed. That is, some additional speedup rate was applied to the audio segment corresponding to the text having the first format. The legend can indicate text having a second format, such as italicized text that is also colored and boxed, which indicates the first speech dub is at a very fast speed. That is, a very high or maximum speedup rate was applied to the audio segment corresponding to the text having the second format. In FIG. 5, the bottom-right arrow indicates italicized text that is also colored and boxed with a dotted line style to indicate the very fast speed of the targeted text.

Further, the text previously described as being formatted to follow the audio in the video when the creator plays the video can have a highlight around the text being spoken in the audio. In addition to the examples of the italicized text, the colored text, boxed text, and the highlighted text, other formatting of the text can be used. For example, the formatting can be bolded text, underlined text, text with a different font size, text with a different font, text with a constantly changing font size, text with a constantly changing color, moving text, flashing or blinking text, text with a different transparency, text with a different font, and text with a dashed or dotted appearance, among others. Additionally, other indicators can be used to highlight the flagged transcript portions. For example, a shape, such as the box, can encompass, entirely or partially, a portion of the text that includes an automated speech recognition error that can be corrected (as shown). The shape can be formatted according to the previously listed examples of text formatting.

In an embodiment, the speaker's emotion in the original video (e.g., happy, sad, excited, pensive, etc.) can be lost during the speech-to-text conversion and therefore the emotion can be detected and tagged at the corresponding location in the original transcript and the translated aligned transcript. For example, the first language can be English and a portion of the video has the speaker in an angry emotional state. This can be indicated by an increased speaking volume, faster speaking cadence, and curse words. While reviewing the original transcript and the translated aligned transcript, the creator can see this emotion formatted with a predetermined format to indicate an angry emotional state will apply to the dub at the corresponding portion. Thus, the creator can decide to either retain the angry portion or remove or revise the angry portion to adjust the dub. For example, the creator can revise the angry portion to remove the curse words, but still apply an increased volume to the dub. At the end, during the generation of the dub, the dub can therefore carry over that same emotion in the voice of the dub. Similarly, the emotion can be missing from the reviewed documents and the creator can annotate a segment of the original transcript and/or the translated aligned transcript to indicate that speech for the corresponding translated segment should be synthesized to convey a specific emotion. For example, "Oh no!" should be said in a frightened way.

In an embodiment, the speaker's emotion in the original video can be detected but adjusted based on the language of the speaker. For example, the first language can be German and the second electronic device 110 can incorrectly determine the entirety of the original video is spoken in an angry emotional state based on the volume and cadence as compared to, for example, English. Therefore, the second electronic device 110 can determine the first language is German and automatically adjust a parameter for detecting the emotion of the speaker. For example, the second electronic device 110 can allow for a faster speaking cadence threshold in German before labeling the corresponding portion as an angry emotion. By doing so, the eventual dub into the second language will not result in a video that sounds entirely angry.

In an embodiment, the second electronic device 110 can adjust the emotion of the dub by adjusting the translated audio using an increased volume modifier and/or an increased speed (cadence) modifier to mimic the angry emotion of the original audio in the first language. The intensity of the modifier can also be based on the level of detected emotion in the original audio in the first language. For example, the speaker's angry emotion can increase over a length of time speaking, wherein the start of the angry portion includes a lower increase in volume and cadence as compared to the end of the angry portion that includes a higher increase in volume and cadence. Therefore, a concomitant lower increase in volume and cadence can be applied to the start of the angry portion in the dub and a higher increase in volume and cadence can be applied to the end of the angry portion in the dub. In an embodiment, the dub can be generated using a bank of translated words, wherein the bank of translated words can include multiple pre-recorded emotional variations of each word and the corresponding emotional variation of the target translated word can be used for the dub at the corresponding portion.

In an embodiment, additional icons can be inserted in the text to indicate relevant times in the video that correlate to the location of the icon in the text. For example, a thumb tack or pin icon can be inserted or pinned (as shown) to indicate a key moment. The key moment can be, for example, a moment where the alignment of text (of the translated aligned transcript) and audio has a high priority. At such a key moment, the dubbed audio segment can, for example, always start at the same time as when the original audio plays in the video.

In an embodiment, determining when to pin something is left to the user's judgement and is not always obvious or intuitive. However, because the timing adjustments were determined, it is known when speech segments in the video have drifted significantly and therefore the UI 305 can proactively suggest that the creator pin those segments if needed. Notably, even when the timing drift isn't significant, pins during scene changes can be desired. For example, the video can shift from a landscape to someone speaking directly to the camera, but the speech associated with the landscape overlaps into the next segment where the person is already speaking on screen. Thus, the video can be processed to identify such scene changes to also suggest that the creator may want to consider a pin.

Figure 6A:
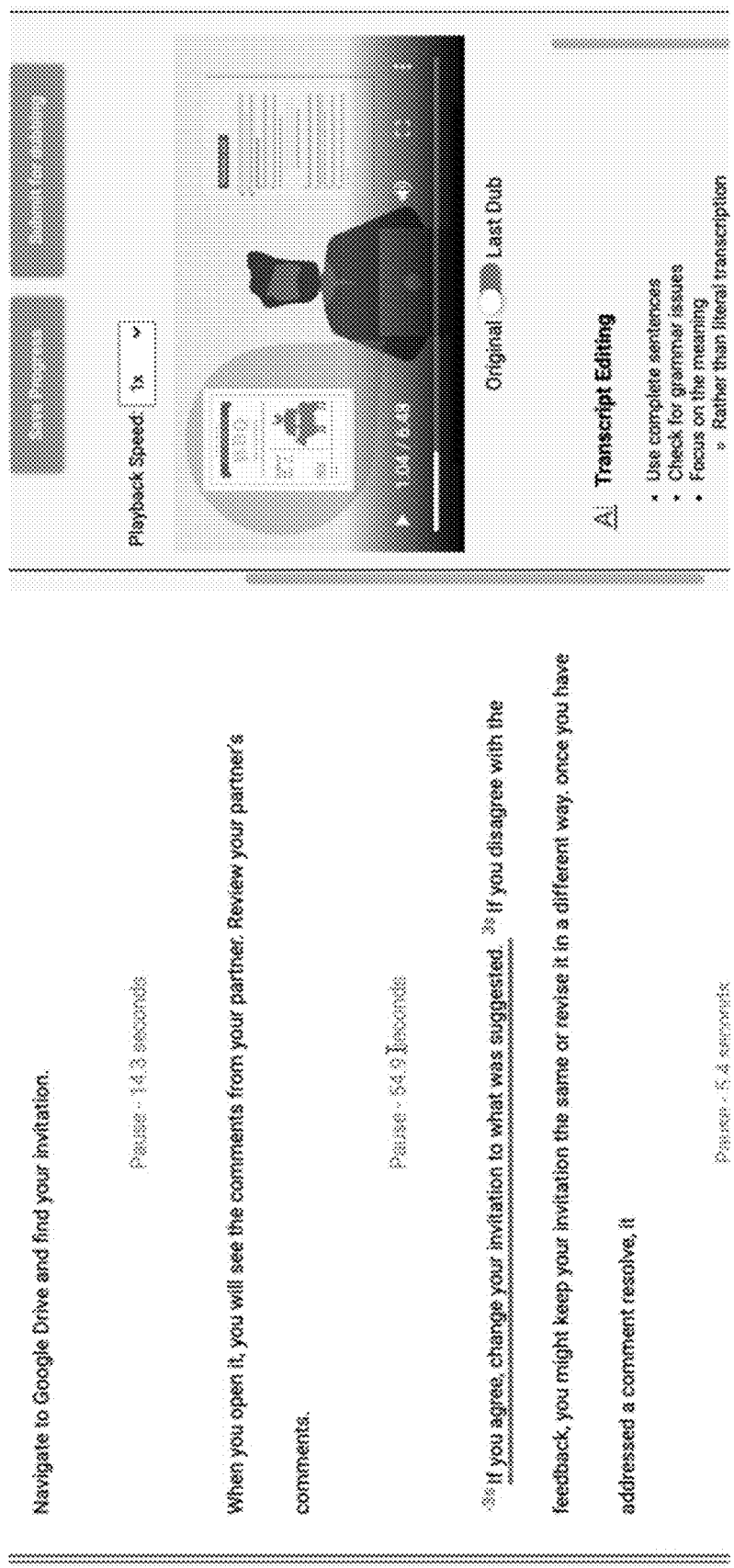
FIG. 6A shows a schematic of the dubbing UI including an auto timing correction, according to an embodiment of the present disclosure.

To this end, FIG. 6A shows a schematic of the dubbing UI 305 including an auto-correction, according to an embodiment of the present disclosure. In an embodiment, the dubbing UI 305 can include text that has been automatically adjusted, such as a timing shift adjustment. As shown, the underlined text can include floating timing adjustment indicators that flank the underlined text and describe the amount of the timing shift. In this example, for the underlined text, a 3 second shift has been applied. Furthermore, note that the underline and the floating timing text also have formatting (e.g., a color change to purple or another bright color) to make the text in question stand out.

In an embodiment, the second electronic device 110 can analyze the flagged transcript portions and generate an automated correction regarding the conciseness to address or supplement the timing shift that may be needed. The automated correction can be generated using, for example, a neural network, previously set user preferences, edit history, or the like (or any combination thereof).

In an embodiment, the neural network can be implemented on the second electronic device 110 and the second electronic device 110 can include instructions to perform application of the neural network. The second electronic device 110 can be configured to apply the neural network to data received, such as the original transcript and the translated aligned transcript, or a set of training data. For example, the training data can include transcript portions that have been edited for conciseness in multiple languages, or transcript portions to which additional superfluous language is introduced via known language modifiers. The second electronic device 110 can identify transcript portions that have been edited similar to the data in the training data and apply generated automated correction based on the neural network. The flagged transcript portions automatically corrected by the second electronic device 110 can of course be formatted in a predetermined style indicate to the creator that the second electronic device 110 applied the generated automated correction and request review and approval.

In an embodiment, the previously set user preferences can include a predefined list of words, phrases, or string of words that can be automatically truncated. For example, words that are commonly used as filler words during pauses that may be generated during the transcription process can be automatically removed to help with timing adjustment. The second electronic device 110 can identify instances of sounds, such as "umm" and "uhh," among others, or words, especially drawn-out words, such as "like" and "so," or phrases repeated often, such as "you know" and "I mean" for removal. Notably, this can be tailored for different languages, such as Japanese where some filler words are different, e.g., "eto" or "ano" for "um" in English.

In an embodiment, previously set user preferences can include a predefined list of words, phrases, or string of words that can be preserved from translation. The creator can annotate a segment of the original transcript to indicate that the segment should not be translated. Depending on the content, some phrases should not be translated. For example, some programming commands (e.g., clear, goto, print, etc.) can be covered in videos about programming where translation is not desirable since translating these commands or terms can remove their meaning.

In an embodiment, the second electronic device 110 can have a record of frequently used edits for a particular creator while editing flagged transcript portions across multiple transcripts. For example, the particular creator can commonly say a wordy phrase in multiple videos (and thus, multiple original transcripts or translated aligned transcripts) that the particular creator then edits for conciseness using the same edited phrase. The same edited phrase can be used to replace the wordy phrase by the second electronic device 110 when the flagged transcript portion is determined to be the same as or similar to wordy phrases from previous videos and transcripts.

For example, returning to the watch review video, the presenter may say "Oh, hi there, umm, I want to introduce myself, and uhh, my name is Robert, and this is, like, a review of an Omega watch, and, I mean, it's one of my favorite watches." The corresponding portion in the translated aligned transcript in Japanese can be significantly longer and include translation errors. As such, the same portion in the original transcript can be flagged and a suggested edit or automatic correction can be "Hi I'm Robert and this is a review of my favorite Omega watch" based on the second electronic device 110 detecting and removing the filler words, and determining the corresponding portion in the translated aligned transcript in Japanese will need the extra time recouped by removing the filler words and translating the shorter "Hi I'm Robert . . . " edit.

For example, returning to the watch review video, the presenter may say "again, it is truly in my most humblest opinion that the Omega Seamaster 300M, which is quite the popular watch right now, is giving the Rolex Submariner a run for its money" multiple times throughout the video, and each instance can be flagged because the corresponding portion in the translated aligned transcript in Japanese can be significantly longer. As such, the same portions in the original transcript can each be flagged for review by the creator. However, upon detecting the creator editing the lengthy statement once to "I think the Omega Seamaster 300M is popular and giving the Rolex Submariner a run for its money," the second electronic device 110 can instruct the first electronic device 105 to generate a prompt asking the creator if all other similar instances can be changed to the same edit the creator just entered. Upon receiving input from the creator via the first electronic device 105 in the affirmative, the second electronic device 110 can automatically correct all other similar instances to the same edit the creator just entered.

Additionally or alternatively, upon detecting the creator editing the lengthy statement twice, the second electronic device 110 can automatically correct all other similar instances to the same edit the creator just entered twice. Each instance of automatic correction can still be flagged to indicate to the creator that the target instance was automatically corrected and not manually corrected.

Note that, as is clear from above, the second electronic device 110 can automatically perform edits or adjustments based on various criteria particular to the user/creator and/or the first electronic device 105. Thus, the particular edits or adjustments performed for a first user can be different from those performed for a second user, and so on. This can be applied differently even for the same video. This ensures customized automation of the process, which helps save time and device/system resources, as the second electronic device 110 does not perform actions that may not be applicable to a particular user.

For example, not every user will use the exact phrase: "Oh, hi there, umm, I want to introduce myself, and uhh, my name is Robert, and this is, like, a review of an Omega watch, and, I mean, it's one of my favorite watches." Other users may be more direct and resourceful with their word choices. As such, the second electronic device 110 need not perform an adjustment of such a phrase for every user since other users may not actually use such a phrase.

Figure 6B:
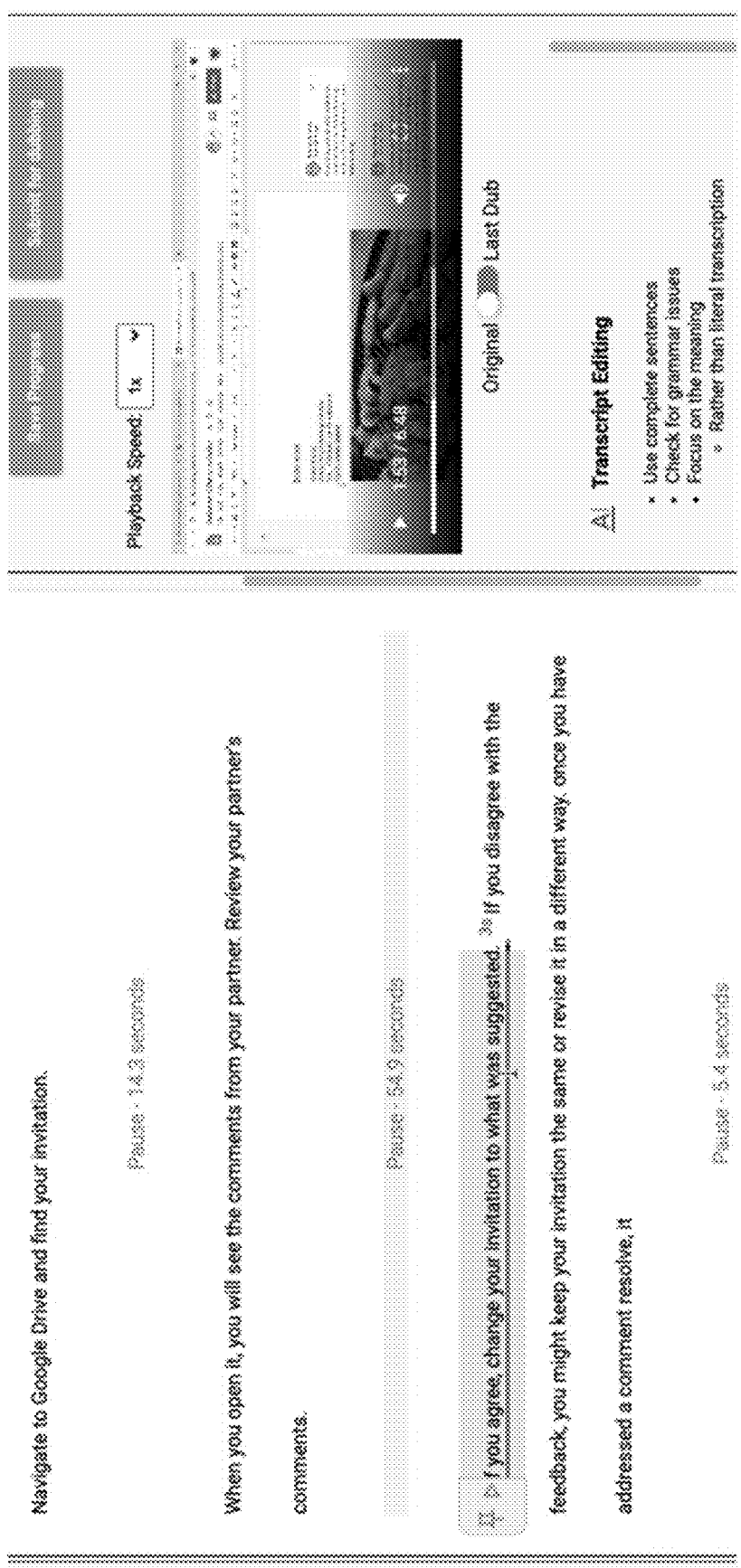
FIG. 6B shows a schematic of receiving user or creator edits, according to an embodiment of the present disclosure.

With reference to step 240 of method 200, FIG. 6B shows a schematic of receiving user or creator edits, according to an embodiment of the present disclosure. In an embodiment, the creator can review all the aforementioned flagged transcript portions and address any that need edits and/or approval. As shown in FIG. 6B, the creator can decide that the target flagged transcript portion (the automatically time adjusted text) should not be approved and the original timing window of the original audio should remain the same. That is, the creator can decide that the dubbed audio should start at the same time as the original audio. Therefore, to implement this, the creator can hover over the automatically time adjusted text, which brings up a thumb tack or pin to allow the user to reject the time adjustment and actively pin the dub at this time to the original timing of the original video.

Figure 6C:
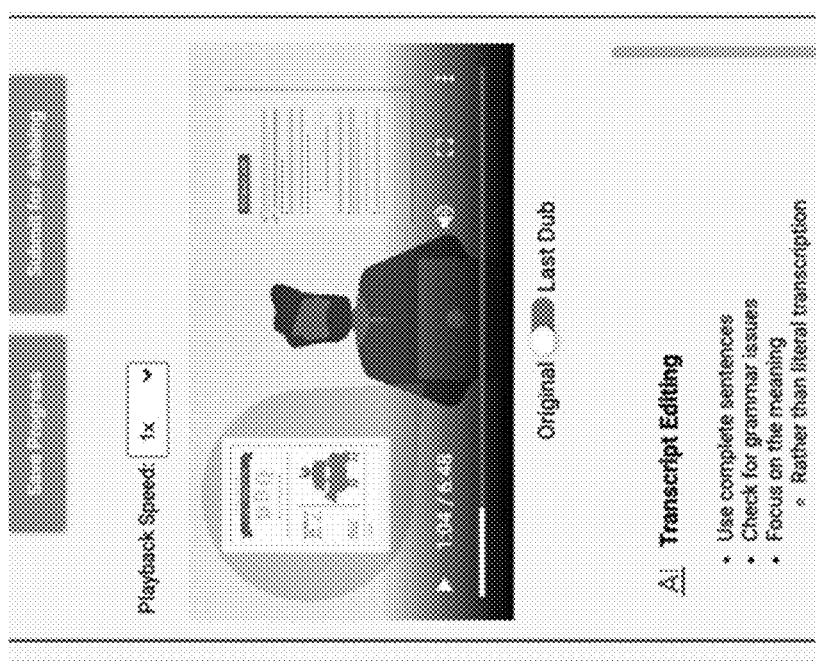
FIG. 6C shows a schematic of dub speed adjustment indication, according to an embodiment of the present disclosure.

FIG. 6C shows a schematic of dub speed adjustment indication, according to an embodiment of the present disclosure. In an embodiment, the dubbing UI 305 can include a portion of the text formatted in the different font color plus the box having the dotted line style to indicate the text has a very high-speed adjustment applied and solicit edits from the creator. Notably, a grammatical error is also present and can be addressed by the creator at the same time.

FIG. 6D shows a schematic of dub speed adjustment editing, according to an embodiment of the present disclosure. In an embodiment, the creator can edit the original transcript text that was previously too lengthy in order to cut down on the translation length at the corresponding time in the first speech dub. As shown, the edited original transcript text can change formatting to also indicate a satisfactory edit has been input. For example, the new text for dubbing can be formatted to be green in color (or any different color from the ones already mentioned), indicating that the first speech dub will be able to fit the dubbed audio into the timing window of the original audio. The previous box with the dotted line style can also be removed. It may be appreciated that other formatting can be applied or icons can be inserted to indicate the same measure of successful edit. For example, a thumbs-up icon or a check box (as shown) can be inserted to indicate to the user that the edited text is satisfactory for the dub.

In an embodiment, reducing the variance of speed adjustments can be performed by the second electronic device 110. If two sequential segments or portions have very different speeds, the two sequential segments can sound strange to the viewer, even if individually the two sequential segments sound acceptable. That is to say, a first portion of the text can have a very high speed adjustment, while a second (sequential) portion of the text can have a more minor speed adjustment. While the first portion of the text with the very high speed adjustment and the second portion of the text with the minor speed adjustment can sound acceptable separately, the change in the speed adjustment when heard by the user can sound much less pleasing. Therefore, in this case, the adjustment process or algorithm can prefer to increase the speed of one portion and decrease the speed of the other, extend the time window of either portion, or some combo of both. This can thus reduce the variance of speed between segments, leading to a more consistent and uniform speaking cadence.

In an embodiment, a same or similar flagged transcript portion can be repeated in the original transcript text. The second electronic device 110 can identify the similar flagged transcript portions and help reduce the amount of editing needed from the creator by applying the same edit to the identified similar flagged transcript portions. For example, as shown in FIG. 6D, the second electronic device 110 can identify all instances of "To see all comments your partner made including the ones. You resolved open the comments thread" or similar phrasing (e.g., "open the comments thread to see all comments your partner made, including the ones you resolved") and apply the previous creator edit of "To see all the comments open the comments thread."

The second electronic device 110 can perform the automated correction after the first edit by the creator or wait and detect more than one same edit by the creator. That is, the second electronic device 110 can confirm that the creator performs the same edit twice, for example, or thrice before automatically correcting all the same or similar flagged transcript portions repeated in the original transcript text. As described below, this automated correction can also occur for the translated aligned transcript.

As previously described, the creator can switch between editing the original transcript and the translated aligned transcript. Thus, while editing the flagged transcript portions in the original transcript has been described, the creator can, if he/she is familiar with the second language, also edit the flagged transcript portions in the translated aligned transcript (in the second language) as well. For example, returning to the watch review video, the creator can determine that the dub of "Hi I'm Robert" in English to "watashi wa Robert tomoshimasu" in Japanese (here written in Romaji) sounds unnatural and too fast after, for example, listening to the dub in Japanese. As such, the creator can switch from the original transcript to the translated aligned transcript and edit the Japanese (either in Romaji or Kanji) to the shorter (but less formal) "watashi wa Robert."

In an embodiment, the creator can review all the flagged transcript portions and address each one until all are successfully updated or manually over-ridden to finalize the original transcript and generate an updated or a modified original transcript. Notably, a modified translated aligned transcript can also be generated based on the modified original transcript and/or the creator's edits applied to the translated aligned transcript using the dubbing UI 305. It may be appreciated that while the dubbing UI 305 has been described as receiving the creator input, the creator can also input edits directly into a text-based document file, such as a Rich Text Format file, having all the text formatting generated and pre-applied by the second electronic device 110.

In an embodiment, the original transcript can be transmitted or provided to a second user, such as an employee or technician at a document review service using the third device 115, to perform the reviewing and editing of the original transcript to generate the modified original transcript. The second user can follow the same process as the creator to address each flagged transcript portion and, based on the provided text formatting, legend information, and instructions, adjust the original transcript (or the translated aligned transcript) so each issue is corrected.

In an embodiment, both the creator and the second user can review and adjust the original transcript and send both versions of the modified original transcript, via the first device 105 and the third device 115, to the second electronic device 110. The second electronic device 110 can apply a weight to each version of the modified original transcript and, upon determining a flagged transcript portion was addressed by both the creator and the second user, select the adjustment from the modified original transcript with the higher weight.

For example, the creator-generated modified original transcript can have a higher assigned weight than the second user-generated modified original transcript and upon determining a portion of text in the modified original transcript was edited for conciseness by both the creator and the second user, the second electronic device 110 can use the conciseness edit by the creator. Upon determining a flagged transcript portion was not addressed by either the creator or the second user, the second electronic device 110 can use the only available conciseness edit regardless of weight.

In an embodiment, the second user can review and adjust the original transcript and send the second user-generated modified original transcript to the creator for a final review. The creator can address any flagged transcript portions the second user did not feel qualified to address. The creator can also review each flagged transcript portion addressed by the second user and accept or reject and apply a different correction to the target flagged transcript portion.

In an embodiment, the creator and the second user can review and adjust the original transcript together in real-time to generate the most optimal corrections for the flagged transcript portions. For example, the second user can be fluent in the second language and provide a preliminary translation of the conciseness edit to the creator and determine whether the conversion of the conciseness edit to the dub can fit within a predetermined timing window. For example, returning to the watch review video, the second user is fluent in both English and Japanese and can edit the lengthy, filler-filled introductory sentence to "Hi I'm Robert and this is a review of my favorite Omega watch" and request approval from the creator for the proposed edit. The second user can further switch to the translated aligned transcript and edit the lengthier translation of "watashi wa Robert tomoshimasu" down to the less formal "watashi wa Robert" and request approval from the creator for the proposed translation edit.

With reference to step 240 of method 200 and FIG. 3, the second electronic device 110 can receive, from the creator, the modified original transcript and the modified translated aligned transcript. As previously mentioned, the modified translated aligned transcript can be generated based on the modified original transcript via a text to speech process and/or the creator's edits applied directly to the translated aligned transcript using the dubbing UI 305 and switching between the original transcript and the translated aligned transcript. In an embodiment, the second electronic device 110 can perform another check of the predicted audio segment alignment with the portions of the modified original transcript. In the event the creator did not edit the original transcript sufficiently or manually over-rode the approval of the flagged transcript portions, the second electronic device 110 can determine the predicted timing conflicts still present in the modified original transcript and provide an alert to the creator. The second electronic device 110 can further request approval from the creator to proceed with generating the subsequent dub based on the modified original transcript still having the predicted timing conflicts knowing that the resulting audio can potentially sound audibly unsatisfactory.

With reference to step 245 of method 200 and FIG. 3, the second electronic device 110 can generate a second speech dub in the second language based on the modified original transcript or the modified translated aligned transcript. Similar to the first speech dub, the second speech dub can use a text to speech process, among others. It may be appreciated that additional speech dubs in additional languages can be generated with little to no additional effort by translating the modified original transcript to the new (third) desired language and automatically applying the same type of aforementioned alignment optimization for the new desired language. In an embodiment, the second electronic device 110 can highlight in the UI all the problematic portions of a transcript to the creator not only based on the second language, but also the third language, a fourth language, etc., so the creator can update the transcript to dub properly into N languages all at once. However, different languages can have different characteristics and a sentence that is too fast when translated into Japanese may be fine when translated into Spanish. To avoid creators having to edit multiple target language specific transcripts, a consolidated view of transcript issues that span all the target languages can be provided to the creator. This means that the creator can address all the identified issues in one transcript which then becomes the source for translations into multiple languages.

In an embodiment, the second electronic device 110 can automatically find and suggest best voice matches (from a library of available synthetic voices) to speakers on the video. This can allow the first speech dub and the second speech dub to be distinct from other dubs and better reflect the voice of the speakers in the original video. Currently, creators or users listen to the available voices and make selections based on their own judgment.

In an embodiment, the voice of the creator can be cloned for use in the first speech dub and the second speech dub. For example, a synthetic voice model can be trained and used to synthesize speech in the second (or any target) language. This can allow the first speech dub and the second speech dub to have the same voice as the original video.

In an embodiment, while translating the speech track on a video does a lot to make the content accessible, in some cases this is not enough. Some videos can include language-specific textual content presented visually. For example, an instructional video can visually list out the 3 steps required to complete a task. To address this, (i) optical character recognition techniques can be used on the video/visual content to extract embedded text, (ii) the text can be translated analogously to how the speech components are translated, and (iii) the video can be re-rendered with the translated text overlaid on the original text. This will result in a more complete translation that covers both the visual and auditory aspects of the original content.

With reference to step 250 of method 200 and FIG. 3, the second electronic device 110 can combine the second speech dub with the original video data to generate a second dubbed video. In an embodiment, based on the review and edits from the creator, the second dubbed video can have audio segments with improved timing and less speed adjustment.

With reference to step 255 of method 200 and FIG. 3, the second electronic device 110 can output the second dubbed video. For example, the second electronic device 110 can instruct the dubbing UI 305 on the first electronic device 105 to display the second dubbed video in a display of the first electronic device 105 and request another iteration of edits from the creator. For example, the second electronic device 110 can display the second dubbed video on a display of the second electronic device 110.

In an embodiment, the translation of the original transcript to the second language can result in some portions of synthesized speech being too long (as addressed above), but also occasionally too short. In such an event, the synthesized speech stops before lips of the speaker on the video stop moving. To address this, the speed of the synthesized speech can be slowed down, but this can in turn affect the listenability of the dub. Thus, the video can be modified to artificially move the lips of the speaker while synthesized speech is being output. In an embodiment, the lip movement can be not aligned with the synthesized speech. In an embodiment, another approach to ensure lip movements are in sync with the synthesized speech is to modify the synthesized speech to match the lip movements. For example, if the translation is "hello", but the existing lip movements match with "hellloooo!" the speech would be synthesized to match the latter. This has the benefit of not requiring modifications to the video while preserving lip and speech alignment. In an embodiment, another approach is to modify the lip movements on the original video to match the synthesized speech in the target language.

It may be appreciated that while the methods described above are primarily targeted at video content, a similar approach can be applied for audio-only content, such as podcasts, audiobooks, audio articles, etc.

In summary, the disclosed embodiments include numerous technical advantages. The timeline-based editing plus necessity for language skills plus voice acting are what make other dubbing methods very costly, which the method disclosed herein transcends. Traditional dubbing also requires audio production skills to provide the full auditory experience for consumers.

In one advantage, by extracting the background audio (all non-speech sound) and preserving it in the dub, the method eliminates the need for audio production skills. Further, having a human insert the recorded audio segments into a video manually (the current standard for dubbing) is very time consuming, so performing this automatically reduces effort and cost. The timing algorithm could also work with human-recorded voices, and would still save effort and time for editing/production.

In one advantage, the method is not a timeline-based editor where the creator sees and edits text in context of the time it is spoken in the video. A timeline-based editor can make the editing process similar to rounds of video editing and is time-consuming.

In one advantage, the method can automate the timing of the dubbed speech and present timing issues to the creator. Without correcting the timing of the dubbed speech, the quality of an automated dub becomes very poor because the dubbed voice will have to be sped up or slowed down to match. Not only does the fast/slow voice sound unnatural, but each audio clip can have a different speed than the last which intensifies the unnatural quality.

In one advantage, the method need not show any time stamps and instead shows sentences and paragraphs, wherein the creator is mainly responsible for correcting the text and the method's automated timing adjustment can determine the timing of the translated/dubbed speech. In one advantage, since editing timing is important for a natural sound, the editing process can be enhanced by automatically applying predetermined formatting to the text. The creator can then view the automatic formatting, such as highlight or text manipulation, to correct any transcription errors or making portions more concise for timing errors.

Again, timing is less of a worry for the creator since the timing is adjusted automatically by the method (previously mentioned advantage). The optimization of the timing of the dubbed speech also presents additional advantages, wherein the rate of speech that is faster than natural can be minimized, the differences between rate of speech in consecutive sentences can be minimized, and the differences in when sentences start and end can be minimized (to keep the speech aligned with the video).

Embodiments of the subject matter and the functional operations described in this specification are implemented by processing circuitry (on one or more of electronic device 105 and 110), in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the devices of FIG. 1 or the like). The computer storage medium can be a machine-readable storage device, a machine-readable storage substrate, a random or serial access memory device, or a combination of one or more of them.

The term "data processing apparatus" refers to data processing hardware and may encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both or any other kind of central processing unit. Generally, a CPU will receive instructions and data from a read-only memory or a random-access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Electronic device 700 shown in FIG. 7 can be an example of one or more of the devices shown in FIG. 1. In an embodiment, the device 700 may be a smartphone. However, the skilled artisan will appreciate that the features described herein may be adapted to be implemented on other devices (e.g., a laptop, a tablet, a server, an e-reader, a camera, a navigation device, etc.). The device 700 of FIG. 7 includes processing circuitry, as discussed above. The processing circuitry includes one or more of the elements discussed next with reference to FIG. 7. The device 700 may include other components not explicitly illustrated in FIG. 7 such as a CPU, GPU, frame buffer, etc. The device 700 includes a controller 710 and a wireless communication processor 702 connected to an antenna 701. A speaker 704 and a microphone 705 are connected to a voice processor 703.

The controller 710 may include one or more processors/processing circuitry (CPU, GPU, or other circuitry) and may control each element in the device 700 to perform functions related to communication control, audio signal processing, graphics processing, control for the audio signal processing, still and moving image processing and control, and other kinds of signal processing. The controller 710 may perform these functions by executing instructions stored in a memory 750. Alternatively, or in addition to the local storage of the memory 750, the functions may be executed using instructions stored on an external device accessed on a network or on a non-transitory computer readable medium.

The memory 750 includes but is not limited to Read Only Memory (ROM), Random Access Memory (RAM), or a memory array including a combination of volatile and non-volatile memory units. The memory 750 may be utilized as working memory by the controller 710 while executing the processes and algorithms of the present disclosure. Additionally, the memory 750 may be used for long-term storage, e.g., of image data and information related thereto.

The device 700 includes a control line CL and data line DL as internal communication bus lines. Control data to/from the controller 710 may be transmitted through the control line CL. The data line DL may be used for transmission of voice data, display data, etc.

The antenna 701 transmits/receives electromagnetic wave signals between base stations for performing radio-based communication, such as the various forms of cellular telephone communication. The wireless communication processor 702 controls the communication performed between the device 700 and other external devices via the antenna 701. For example, the wireless communication processor 702 may control communication between base stations for cellular phone communication.

The speaker 704 emits an audio signal corresponding to audio data supplied from the voice processor 703. The microphone 705 detects surrounding audio and converts the detected audio into an audio signal. The audio signal may then be output to the voice processor 703 for further processing. The voice processor 703 demodulates and/or decodes the audio data read from the memory 750 or audio data received by the wireless communication processor 702 and/or a short-distance wireless communication processor 707. Additionally, the voice processor 703 may decode audio signals obtained by the microphone 705.

The exemplary device 700 may also include a display 720, a touch panel 730, an operation key 740, and a short-distance communication processor 707 connected to an antenna 706. The display 720 may be an LCD, an organic electroluminescence display panel, or another display screen technology. In addition to displaying still and moving image data, the display 720 may display operational inputs, such as numbers or icons which may be used for control of the device 700. The display 720 may additionally display a GUI for a user to control aspects of the device 700 and/or other devices. Further, the display 720 may display characters and images received by the device 700 and/or stored in the memory 750 or accessed from an external device on a network. For example, the device 700 may access a network such as the Internet and display text and/or images transmitted from a Web server.

The touch panel 730 may include a physical touch panel display screen and a touch panel driver. The touch panel 730 may include one or more touch sensors for detecting an input operation on an operation surface of the touch panel display screen. The touch panel 730 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus may include a conductive material at least at the tip of the stylus such that the sensors included in the touch panel 730 may detect when the stylus approaches/contacts the operation surface of the touch panel display (similar to the case in which a finger is used for the touch operation).

In certain aspects of the present disclosure, the touch panel 730 may be disposed adjacent to the display 720 (e.g., laminated) or may be formed integrally with the display 720. For simplicity, the present disclosure assumes the touch panel 730 is formed integrally with the display 720 and therefore, examples discussed herein may describe touch operations being performed on the surface of the display 720 rather than the touch panel 730. However, the skilled artisan will appreciate that this is not limiting.

For simplicity, the present disclosure assumes the touch panel 730 is a capacitance-type touch panel technology. However, it should be appreciated that aspects of the present disclosure may easily be applied to other touch panel types (e.g., resistance-type touch panels) with alternate structures. In certain aspects of the present disclosure, the touch panel 730 may include transparent electrode touch sensors arranged in the X-Y direction on the surface of transparent sensor glass.

The touch panel driver may be included in the touch panel 730 for control processing related to the touch panel 730, such as scanning control. For example, the touch panel driver may scan each sensor in an electrostatic capacitance transparent electrode pattern in the X-direction and Y-direction and detect the electrostatic capacitance value of each sensor to determine when a touch operation is performed. The touch panel driver may output a coordinate and corresponding electrostatic capacitance value for each sensor. The touch panel driver may also output a sensor identifier that may be mapped to a coordinate on the touch panel display screen. Additionally, the touch panel driver and touch panel sensors may detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 730 may detect a position of a user's finger around an edge of the display panel 720 (e.g., gripping a protective case that surrounds the display/touch panel). Signals may be transmitted by the touch panel driver, e.g., in response to a detection of a touch operation, in response to a query from another element based on timed data exchange, etc.

The touch panel 730 and the display 720 may be surrounded by a protective casing, which may also enclose the other elements included in the device 700. In an embodiment, a position of the user's fingers on the protective casing (but not directly on the surface of the display 720) may be detected by the touch panel 730 sensors. Accordingly, the controller 710 may perform display control processing described herein based on the detected position of the user's fingers gripping the casing. For example, an element in an interface may be moved to a new location within the interface (e.g., closer to one or more of the fingers) based on the detected finger position.

Further, in an embodiment, the controller 710 may be configured to detect which hand is holding the device 700, based on the detected finger position. For example, the touch panel 730 sensors may detect a plurality of fingers on the left side of the device 700 (e.g., on an edge of the display 720 or on the protective casing), and detect a single finger on the right side of the device 700. In this exemplary scenario, the controller 710 may determine that the user is holding the device 700 with his/her right hand because the detected grip pattern corresponds to an expected pattern when the device 700 is held only with the right hand.

The operation key 740 may include one or more buttons or similar external control elements, which may generate an operation signal based on a detected input by the user. In addition to outputs from the touch panel 730, these operation signals may be supplied to the controller 710 for performing related processing and control. In certain aspects of the present disclosure, the processing and/or functions associated with external buttons and the like may be performed by the controller 710 in response to an input operation on the touch panel 730 display screen rather than the external button, key, etc. In this way, external buttons on the device 700 may be eliminated in lieu of performing inputs via touch operations, thereby improving watertightness.

The antenna 706 may transmit/receive electromagnetic wave signals to/from other external apparatuses, and the short-distance wireless communication processor 707 may control the wireless communication performed between the other external apparatuses. Bluetooth, IEEE 802.11, and near-field communication (NFC) are non-limiting examples of wireless communication protocols that may be used for inter-device communication via the short-distance wireless communication processor 707.

The device 700 may include a motion sensor 708. The motion sensor 708 may detect features of motion (i.e., one or more movements) of the device 700. For example, the motion sensor 708 may include an accelerometer to detect acceleration, a gyroscope to detect angular velocity, a geomagnetic sensor to detect direction, a geo-location sensor to detect location, etc., or a combination thereof to detect motion of the device 700. In an embodiment, the motion sensor 708 may generate a detection signal that includes data representing the detected motion. For example, the motion sensor 708 may determine a number of distinct movements in a motion (e.g., from start of the series of movements to the stop, within a predetermined time interval, etc.), a number of physical shocks on the device 700 (e.g., a jarring, hitting, etc., of the electronic device), a speed and/or acceleration of the motion (instantaneous and/or temporal), or other motion features. The detected motion features may be included in the generated detection signal. The detection signal may be transmitted, e.g., to the controller 710, whereby further processing may be performed based on data included in the detection signal. The motion sensor 708 can work in conjunction with a Global Positioning System (GPS) section 760. The information of the present position detected by the GPS section 760 is transmitted to the controller 710. An antenna 761 is connected to the GPS section 760 for receiving and transmitting signals to and from a GPS satellite.

The device 700 may include a camera section 709, which includes a lens and shutter for capturing photographs of the surroundings around the device 700. In an embodiment, the camera section 709 captures surroundings of an opposite side of the device 700 from the user. The images of the captured photographs can be displayed on the display panel 720. A memory section saves the captured photographs. The memory section may reside within the camera section 709 or it may be part of the memory 750. The camera section 709 can be a separate feature attached to the device 700 or it can be a built-in camera feature.

An example of a type of computer is shown in FIG. 8. The computer 800 can be used for the operations described in association with any of the computer-implement methods described previously, according to one implementation. For example, the computer 800 can be an example of the first electronic device 105, or a server (such as the second electronic device 110). The computer 800 includes processing circuitry, as discussed above. The device 850 may include other components not explicitly illustrated in FIG. 8 such as a CPU, GPU, frame buffer, etc. The processing circuitry includes one or more of the elements discussed next with reference to FIG. 8. In FIG. 8, the computer 800 includes a processor 810, a memory 820, a storage device 830, and an input/output device 840. Each of the components 810, 820, 830, and 840 are interconnected using a system bus 850. The processor 810 is capable of processing instructions for execution within the system 800. In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the computer 800. In one implementation, the memory 820 is a computer-readable medium. In one implementation, the memory 820 is a volatile memory. In another implementation, the memory 820 is a non-volatile memory.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the computer 800. In one implementation, the input/output device 840 includes a keyboard and/or pointing device. In another implementation, the input/output device 840 includes a display for displaying graphical user interfaces.

Next, a hardware description of a device 901 according to exemplary embodiments is described with reference to FIG. 9. In FIG. 9, the device 901, which can be the above described devices of FIG. 1, includes processing circuitry, as discussed above. The processing circuitry includes one or more of the elements discussed next with reference to FIG. 9. The device 901 may include other components not explicitly illustrated in FIG. 9 such as a CPU, GPU, frame buffer, etc. In FIG. 9, the device 901 includes a CPU 900 which performs the processes described above/below. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the device communicates, such as a server or computer.

Further, the claimed advancements may be provided as a utility application, background daemon, or component of an operating system, or combination thereof, executing in conjunction with CPU 900 and an operating system such as Microsoft Windows, UNIX, Solaris, LINUX, Apple MAC-OS and other systems known to those skilled in the art.

The hardware elements in order to achieve the device may be realized by various circuitry elements, known to those skilled in the art. For example, CPU 900 may be a Xenon or Core processor from Intel of America or an Opteron processor from AMD of America, or may be other processor types that would be recognized by one of ordinary skill in the art. Alternatively, the CPU 900 may be implemented on an FPGA, ASIC, PLD or using discrete logic circuits, as one of ordinary skill in the art would recognize. Further, CPU 900 may be implemented as multiple processors cooperatively working in parallel to perform the instructions of the processes described above. CPU 900 can be an example of the CPU illustrated in each of the devices of FIG. 1.

The device 901 in FIG. 9 also includes a network controller 906, such as an Intel Ethernet PRO network interface card from Intel Corporation of America, for interfacing with the network 150 (also shown in FIG. 1), and to communicate with the other devices of FIG. 1. As can be appreciated, the network 150 can be a public network, such as the Internet, or a private network such as an LAN or WAN network, or any combination thereof and can also include PSTN or ISDN sub-networks. The network 150 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 908, such as a NVIDIA GeForce GTX or Quadro graphics adaptor from NVIDIA Corporation of America for interfacing with display 910, such as an LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners.

A sound controller 920 is also provided in the device to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

Obviously, numerous modifications and variations are possible in light of the above teachings. It is therefore to be understood that within the scope of the appended claims, embodiments of the present disclosure may be practiced otherwise than as specifically described herein.

While this specification contains many specific implementation details, these should not be construed as limitations on the scope of what may be claimed, but rather as descriptions of features that may be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Embodiments of the present disclosure may also be as set forth in the following parentheticals.

(1) A method of dubbing a video, comprising receiving video data and corresponding audio data in a first language; generating, based on this data and an original transcript in the first language, a translated preliminary transcript in a second language; based on the video data in the first language, aligning timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions; based on the translated aligned transcript, generating a first speech dub in the second language and combining the first speech dub with the video data to generate a first dubbed video; transmitting the original transcript, the translated aligned transcript, and the first speech dub to a first device, the generated flagged transcript portions included in the original transcript and the translated aligned transcript; receiving, from the first device, a modified original transcript; and generating, based on the modified original transcript, a second speech dub in the second language.

(2) The method of (1), further comprising combining the second speech dub in the second language with the video data excluding the audio data in the first language to generate dubbed a second dubbed video; and outputting the second dubbed video via a user device.

(3) The method of either (1) or (2), wherein the transmitting the original transcript, the translated aligned transcript, and the first speech dub to the first device further comprises transmitting the original transcript, the translated aligned transcript, and the first speech dub to the first device to be displayed.

(4) The method of (3), wherein the transmitting the original transcript, the translated aligned transcript, and the first speech dub to the first device further comprises displaying the original transcript with the flagged transcript portions and the translated aligned transcript with the flagged transcript portions at the corresponding location in the translated aligned transcript as the original transcript.

(5) The method of (4), wherein the flagged transcript portions include text corresponding to portions of the first speech dub that have a timing adjustment applied, and the transmitting the original transcript, the translated aligned transcript, and the first speech dub to the first device further comprises applying a formatting to the text corresponding to portions of the first speech dub that have a timing adjustment applied.

(6) The method of (5), wherein the formatting applied to the text is based on an amount of the timing adjustment applied, the formatting being more visible as the amount of the timing adjustment applied increases.

(7) The method of any one of (1) to (6), wherein determining the portions of the translated aligned transcript in the second language that do not fit within the timing window range of the corresponding segments of the audio data further comprises applying a timing adjustment to the portions of the translated aligned transcript determined to not fit within the timing window range of the corresponding segments of the audio data, the timing adjustment not exceeding a predetermined maximum speedup rate.

(8) The method of any one of (1) to (7), wherein neighboring portions of the translated aligned transcript determined to exceed the timing window range of the corresponding segments of the audio data are merged together.

(9) The method of any one of (1) to (8), further comprising assigning a confidence score to words in the generated original transcript; analyzing frames of the video data at times corresponding to words in the generated original transcript with a low confidence score to detect relevant text, symbols, and mouth movements of a human in the frames of the video data; generating a replacement word based on the detected relevant text, symbols, and mouth movements of the human; and replacing the word having the low confidence score with the replacement word.

(10) The method of any one of (1) to (9), further comprising, after the determining portions of the translated aligned transcript in the second language that exceed a timing window range of the corresponding segments of the audio data in the first language to generate flagged transcript portions, automatically re-aligning timing windows, merging timing windows, and adjusting a speed of the flagged transcript portions while maintaining a pitch of the resulting first speech dub.

(11) A non-transitory computer-readable storage medium for storing computer-readable instructions that, when executed by a computer, cause the computer to perform a method, the method comprising receiving video data and corresponding audio data in a first language; generating, based on the audio data and an original transcript in the first language, a translated preliminary transcript in a second language; based on the video data in the first language, aligning timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions; based on the translated aligned transcript, generating a first speech dub in the second language and combining the first speech dub with the video data to generate a first dubbed video; transmitting the original transcript, the translated aligned transcript, and the first speech dub to a first device, the generated flagged transcript portions included in the original transcript and the translated aligned transcript; receiving, from the first device, a modified original transcript; and generating, based on the modified original transcript, a second speech dub in the second language.

(12) The non-transitory computer-readable storage medium of (11), further comprising combining the second speech dub in the second language with the video data excluding the audio data in the first language to generate a second dubbed video; and outputting the second dubbed video via a user device.

(13) The non-transitory computer-readable storage medium of either (11) or (12), wherein the transmitting the original transcript, the translated aligned transcript, and the first speech dub to the first device further comprises transmitting the original transcript, the translated aligned transcript, and the first speech dub to the first device to be displayed.

(14) The non-transitory computer-readable storage medium of (13), wherein the transmitting the original transcript, the translated aligned transcript, and the first speech dub to the first device further comprises displaying the original transcript with the flagged transcript portions and the translated aligned transcript with the flagged transcript portions at the corresponding location in the translated aligned transcript as the original transcript.

(15) The non-transitory computer-readable storage medium of (14), wherein the flagged transcript portions include text corresponding to portions of the first speech dub that have a timing adjustment applied, and the transmitting the original transcript, the translated aligned transcript, and the first speech dub to the first device further comprises applying a formatting to the text corresponding to portions of the first speech dub that have a timing adjustment applied.

(16) The non-transitory computer-readable storage medium of (15), wherein the formatting applied to the text is based on an amount of the timing adjustment applied, the formatting being more visible as the amount of the timing adjustment applied increases.

(17) The non-transitory computer-readable storage medium of any one of (11) to (16), wherein the determining the portions of the translated aligned transcript in the second language that do not fit within the timing window range of the corresponding segments of the audio data further comprises applying a timing adjustment to the portions of the translated aligned transcript determined to not fit within the timing window range of the corresponding segments of the audio data, the timing adjustment not exceeding a predetermined maximum speedup rate.

(18) The non-transitory computer-readable storage medium of any one of (11) to (17), wherein neighboring portions of the translated aligned transcript determined to exceed the timing window range of the corresponding segments of the audio data are merged together.

(19) The non-transitory computer-readable storage medium of any one of (11) to (18), further comprising assigning a confidence score to words in the generated original transcript; analyzing frames of the video data at times corresponding to words in the generated original transcript with a low confidence score to detect relevant text, symbols, and mouth movements of a human in the frames of the video data; generating a replacement word based on the detected relevant text, symbols, and mouth movements of the human; and replacing the word having the low confidence score with the replacement word.

(20) An apparatus for dubbing a video, comprising processing circuitry configured to receive video data and corresponding audio data in a first language; generate, based on the audio data and an original transcript in the first language, a translated preliminary transcript in a second language; based on the video data in the first language, align timing windows of portions of the translated preliminary transcript with corresponding segments of the audio data in the first language to generate a translated aligned transcript; based on the timing windows of the portions of the translated preliminary transcript and timing windows of the corresponding segments of the audio data in the first language, determine portions of the translated aligned transcript in the second language that exceed a timing window range of the corresponding segments of the audio data in the first language to generate flagged transcript portions; based on the translated aligned transcript, generate a first speech dub in the second language and combine the first speech dub with the video data to generate a first dubbed video; transmit the original transcript, the translated aligned transcript, and the first speech dub to a first device, the generated flagged transcript portions included in the original transcript and the translated aligned transcript; receive, from the first device, a modified original transcript; and generate, based on the modified original transcript, a second speech dub in the second language.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

What is claimed is:

1. A method of dubbing a video, comprising:
receiving video data and corresponding audio data in a first language;
generating, based on the audio data and an original transcript in the first language, a translated preliminary transcript in a second language;
based on the video data in the first language, aligning timing windows of portions of the translated preliminary transcript with corresponding segments of the audio data in the first language to generate a translated aligned transcript;
based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions;
based on the translated aligned transcript, generating a first speech dub in the second language and combining the first speech dub with the video data to generate a first dubbed video;
transmitting the original transcript, the translated aligned transcript, and the first speech dub to a first device, the generated flagged transcript portions included in the original transcript and the translated aligned transcript;
receiving, from the first device, a modified original transcript; and generating, based on the modified original transcript, a second speech dub in the second language.

2. The method of claim 1, further comprising combining the second speech dub in the second language with the video data excluding the audio data in the first language to generate dubbed a second dubbed video; and outputting the second dubbed video via a user device.

3. The method of claim 1, wherein the transmitting the original transcript, the translated aligned transcript, and the first speech dub to the first device further comprises transmitting the original transcript, the translated aligned transcript, and the first speech dub to the first device to be displayed.

4. The method of claim 3, wherein the transmitting the original transcript, the translated aligned transcript, and the first speech dub to the first device further comprises displaying the original transcript with the flagged transcript portions and the translated aligned transcript with the flagged transcript portions at a corresponding location in the translated aligned transcript as the original transcript.

5. The method of claim 4, wherein
the flagged transcript portions include text corresponding to portions of the first speech dub that have a timing adjustment applied, and
the transmitting the original transcript, the translated aligned transcript, and the first speech dub to the first device further comprises applying a formatting to the text corresponding to portions of the first speech dub that have a timing adjustment applied.

6. The method of claim 5, wherein the formatting applied to the text is based on an amount of the timing adjustment applied, the formatting being more visible as the amount of the timing adjustment applied increases.

7. The method of claim 1, wherein the determining portions of the translated aligned transcript in the second language that do not fit within the timing window range of the corresponding segments of the audio data further comprises applying a timing adjustment to the portions of the translated aligned transcript determined to not fit within the timing window range of the corresponding segments of the audio data, the timing adjustment not exceeding a predetermined maximum speedup rate.

8. The method of claim 7, wherein neighboring portions of the translated aligned transcript determined to exceed the timing window range of the corresponding segments of the audio data are merged together.

9. The method of claim 1, further comprising
assigning a confidence score to words in the original transcript;
analyzing frames of the video data at times corresponding to words in the original transcript with a low confidence score to detect relevant text, symbols, and mouth movements of a human in the frames of the video data;
generating a replacement word based on the detected relevant text, symbols, and mouth movements of the human; and
replacing the word having the low confidence score with the replacement word.

10. The method of claim 1, further comprising, after the determining portions of the translated aligned transcript in the second language that exceed a timing window range of the corresponding segments of the audio data in the first language to generate flagged transcript portions, automatically re-aligning timing windows, merging timing windows, and adjusting a speed of the flagged transcript portions while maintaining a pitch of the first speech dub.

11. A non-transitory computer-readable storage medium for storing computer-readable instructions that, when executed by a computer, cause the computer to perform a method, the method comprising:
receiving video data and corresponding audio data in a first language;
generating, based on the audio data and an original transcript in the first language, a translated preliminary transcript in a second language;
based on the video data in the first language, aligning timing windows of portions of the translated preliminary transcript with corresponding segments of the audio data in the first language to generate a translated aligned transcript;
based on the timing windows of the portions of the translated preliminary transcript and timing windows of the corresponding segments of the audio data in the first language, determining portions of the translated aligned transcript in the second language that exceed a timing window range of the corresponding segments of the audio data in the first language to generate flagged transcript portions;
based on the translated aligned transcript, generating a first speech dub in the second language and combining the first speech dub with the video data to generate a first dubbed video;
transmitting the original transcript, the translated aligned transcript, and the first speech dub to a first device, the generated flagged transcript portions included in the original transcript and the translated aligned transcript;
receiving, from the first device, a modified original transcript; and
generating, based on the modified original transcript, a second speech dub in the second language.

12. The non-transitory computer-readable storage medium of claim 11, further comprising
combining the second speech dub in the second language with the video data excluding the audio data in the first language to generate a second dubbed video; and
outputting the second dubbed video via a user device.

13. The non-transitory computer-readable storage medium of claim 11, wherein the transmitting the original transcript, the translated aligned transcript, and the first speech dub to the first device further comprises transmitting the original transcript, the translated aligned transcript, and the first speech dub to the first device to be displayed.

14. The non-transitory computer-readable storage medium of claim 13, wherein the transmitting the original transcript, the translated aligned transcript, and the first speech dub to the first device further comprises displaying the original transcript with the flagged transcript portions and the translated aligned transcript with the flagged transcript portions at a corresponding location in the translated aligned transcript as the original transcript.

15. The non-transitory computer-readable storage medium of claim 14, wherein
the flagged transcript portions include text corresponding to portions of the first speech dub that have a timing adjustment applied, and
the transmitting the original transcript, the translated aligned transcript, and the first speech dub to the first device further comprises applying a formatting to the text corresponding to portions of the first speech dub that have a timing adjustment applied.

16. The non-transitory computer-readable storage medium of claim 15, wherein the formatting applied to the text is based on an amount of the timing adjustment applied, the formatting being more visible as the amount of the timing adjustment applied increases.

17. The non-transitory computer-readable storage medium of claim 11, wherein the determining the portions of the translated aligned transcript in the second language that do not fit within the timing window range of the corresponding segments of the audio data further comprises applying a timing adjustment to the portions of the translated aligned transcript determined to not fit within the timing window range of the corresponding segments of the audio data, the timing adjustment not exceeding a predetermined maximum speedup rate.

18. The non-transitory computer-readable storage medium of claim 11, wherein neighboring portions of the translated aligned transcript determined to exceed the timing window range of the corresponding segments of the audio data are merged together.

19. The non-transitory computer-readable storage medium of claim 11, further comprising assigning a confidence score to words in the original transcript;

analyzing frames of the video data at times corresponding to words in the original transcript with a low confidence score to detect relevant text, symbols, and mouth movements of a human in the frames of the video data;

generating a replacement word based on the detected relevant text, symbols, and mouth movements of the human; and replacing the word having the low confidence score with the replacement word.

20. An apparatus for dubbing a video, comprising:
processing circuitry configured to receive video data and corresponding audio data in a first language;

generate, based on the audio data and an original transcript in the first language, a translated preliminary transcript in a second language;

based on the video data in the first language, align timing windows of portions of the translated preliminary transcript with corresponding segments of the audio data in the first language to generate a translated aligned transcript;

based on the timing windows of the portions of the translated preliminary transcript and timing windows of the corresponding segments of the audio data in the first language, determine portions of the translated aligned transcript in the second language that exceed a timing window range of the corresponding segments of the audio data in the first language to generate flagged transcript portions;

based on the translated aligned transcript, generate a first speech dub in the second language and combine the first speech dub with the video data to generate a first dubbed video;

transmit the original transcript, the translated aligned transcript, and the first speech dub to a first device, the generated flagged transcript portions included in the original transcript and the translated aligned transcript;

receive, from the first device, a modified original transcript; and generate, based on the modified original transcript, a second speech dub in the second language.

\* \* \* \* \*